United States Patent [19]

Nakayama et al.

[11] Patent Number: 5,023,799
[45] Date of Patent: Jun. 11, 1991

[54] VEHICULAR TRAVELING DIRECTION MEASURING SYSTEM

[75] Inventors: Okihiko Nakayama; Hiroshi Tsuda; Toshiyuki Itoh; Hiroshi Ueno, all of Kanagawa, Japan

[73] Assignee: Nissan Motor Company, Limited, Japan

[21] Appl. No.: 474,922

[22] Filed: Feb. 6, 1990

[30] Foreign Application Priority Data

Feb. 6, 1989 [JP] Japan .................................. 1-27059

[51] Int. Cl.$^5$ ............................................ G01C 17/38
[52] U.S. Cl. .................... 364/449; 364/454; 364/457; 364/571.05; 33/356
[58] Field of Search ............... 364/443, 449, 453, 454, 364/457, 571.05; 33/356, 357, 355 R; 73/178 R

[56] References Cited

U.S. PATENT DOCUMENTS

| | | | |
|---|---|---|---|
| 4,672,565 | 6/1987 | Kuno et al. | 33/357 |
| 4,673,878 | 6/1987 | Tsushima et al. | 364/449 |
| 4,771,547 | 9/1988 | Akutsu et al. | 33/356 |
| 4,791,574 | 12/1988 | Thoone et al. | 364/457 |
| 4,831,563 | 5/1989 | Ando et al. | 33/356 |
| 4,841,449 | 6/1989 | Suyama | 364/449 |
| 4,862,398 | 8/1989 | Shimizu et al. | 33/356 |
| 4,890,233 | 12/1989 | Ando et al. | 364/457 |

FOREIGN PATENT DOCUMENTS

| | | |
|---|---|---|
| 59-100812 | 6/1984 | Japan . |
| 64-46612 | 2/1989 | Japan . |
| 1-117712 | 8/1989 | Japan . |
| 1-144814 | 10/1989 | Japan . |

Primary Examiner—Gary Chin
Attorney, Agent, or Firm—Lowe, Price, LeBlanc, Becker & Shur

[57] ABSTRACT

A system measures a traveling direction of a vehicle based on a direction toward a coordinate position defined by outputs of a geomagnetic sensor from a first coordinate position of a center of a corresponding output circle. The system utilizes a preliminary coordinate position as a preliminarily corrected value of the first coordinate position, a first value indicative of accuracy of the preliminary coordinate position and a second value which is variable depending on a variation in a magnetization level on a vehicle body. The system derives a finally corrected value of the first coordinate position based on the preliminary coordinate position and a latest value of the finally corrected value which has been derived in a prior execution of the system, by changing a rate which determines a point of the current finally corrected value between the latest finally corrected value and the preliminary coordinate position.

22 Claims, 16 Drawing Sheets

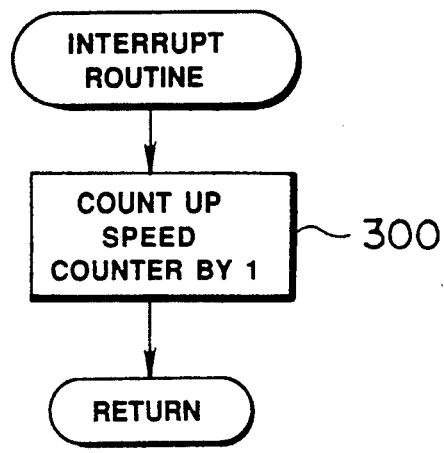
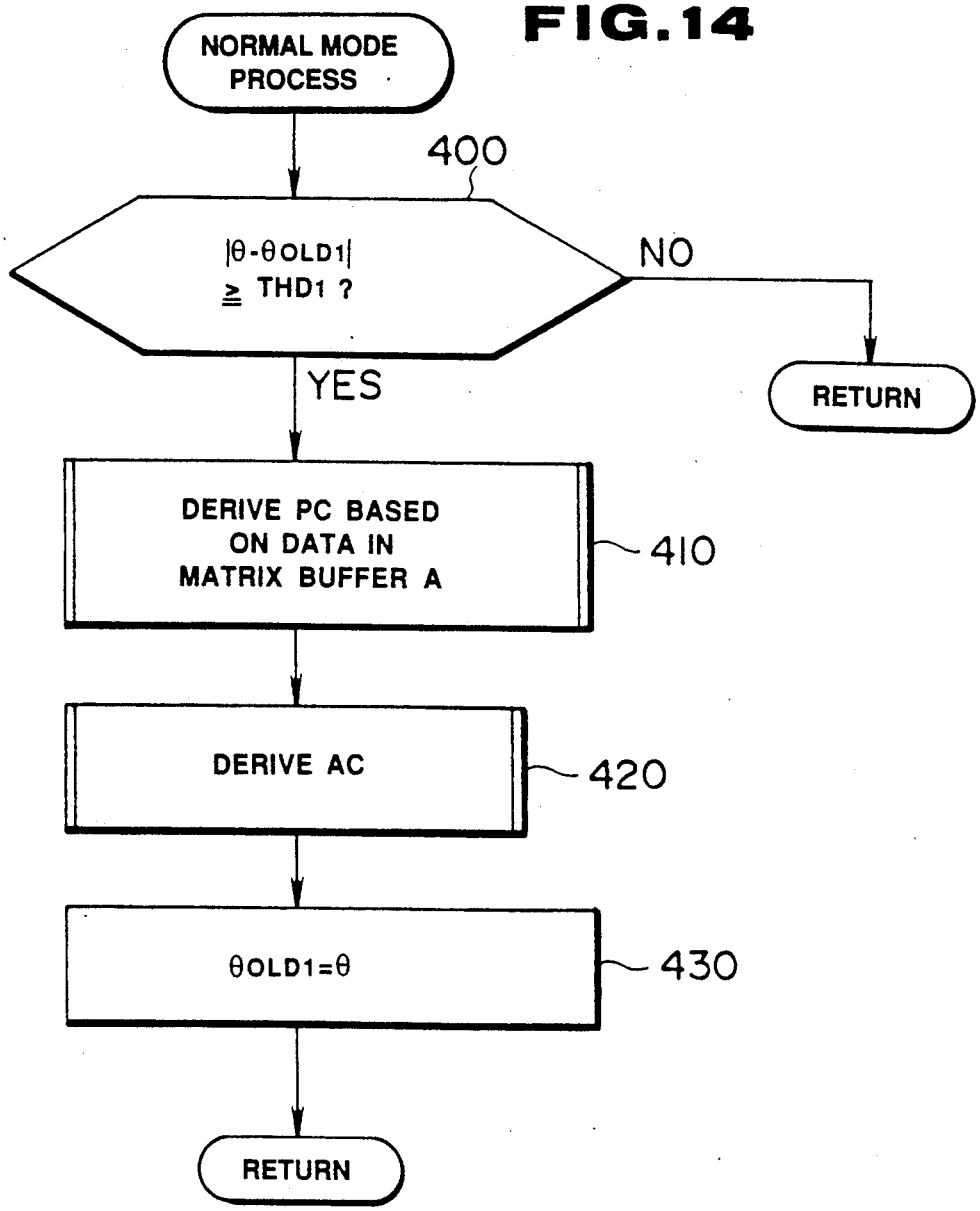

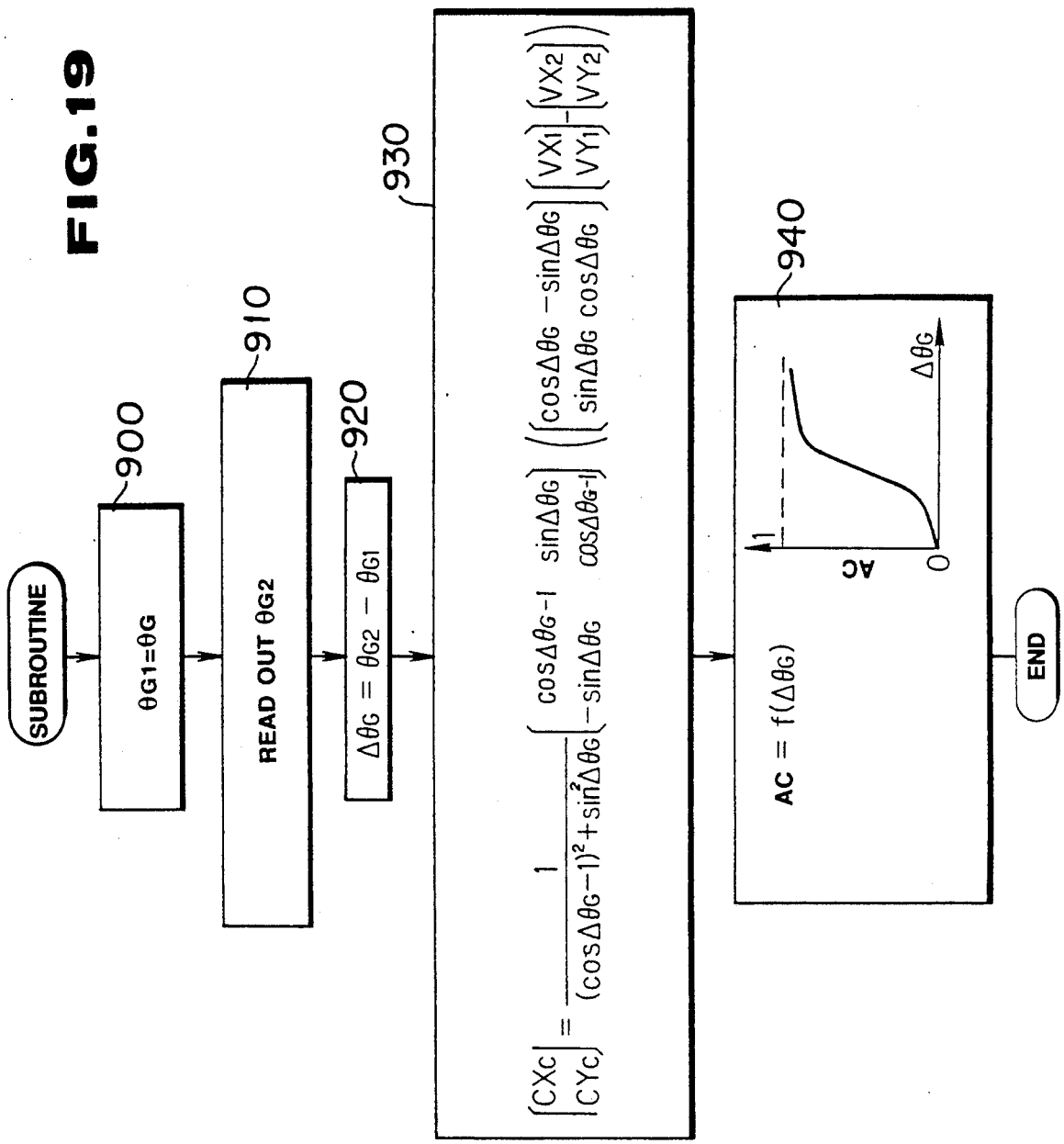

VEHICULAR TRAVELING DIRECTION MEASURING SYSTEM

BACKGROUND OF THE INVENTION

1. Field of the Invention

This invention relates generally to a system for measuring a traveling direction of a vehicle using a geomagnetic direction sensor and, more specifically, to a vehicular traveling direction measuring system which is capable of providing an accurate measurement of a traveling direction of the vehicle even when a vehicle body is magnetized.

2. Description of the Background Art

One of previously proposed systems for measuring a vehicle traveling direction is exemplified by, such as, Japanese First Patent Publication No. 59-100812 published on June 11, 1984.

In the system of this publication, a geomagnetic direction sensor is used for measuring the traveling direction of the vehicle. The geomagnetic direction sensor has a pair of windings which are intersected in perpendicular to each other and arranged on an annular core in a horizontal posture. The geomagnetic direction sensor outputs detected voltages (output values) corresponding to geomagnetic directional components interlinked to the respective windings.

When the vehicle makes one turn under the uniform geomagnetism, an output circle is described on a coordinate plane using coordinate positions each defined by the voltages detected at the respective windings. Accordingly, during a normal traveling of the vehicle, a direction from a center of the output circle toward a coordinate position defined by the detected voltages is derived as a traveling direction of the vehicle.

On the other hand, when the vehicle body is magnetized due to the disturbance of the environmental geomagnetism, the center of the output circle is caused to vary or move, thus resulting in an error in measurement of the traveling direction of the vehicle. To correct this error, one turn of the vehicle is required to derive a new center of a corresponding output circle. Specifically, the output values of the geomagnetic direction sensor are sampled during one turn of the vehicle and then averaged to derive a new or corrected center of the output circle.

In the foregoing background art, however, because a small number of the output values are sampled to be averaged even when the magnetic environment is not preferable, it is substantially impossible to derive a corrected center coordinate position of a corresponding output circle with high accuracy. Further, one turn of the vehicle has to be performed by a driver for the correction.

Still further, although it is desirable to make one turn of the vehicle as soon as possible after the vehicle body is magnetized, it is practically difficult to seek a proper place for making the vehicle turn. Accordingly, the direction measurement error remains during the traveling of the vehicle until finding the proper place for making the vehicle turn.

Further, when the foregoing correction of the center of the output circle is performed in the condition of the large disturbance of the environmental geomagnetism, such as, on a road under a high level road or among high buildings, the correction accuracy becomes less in comparison with the correction accuracy performed in the condition of smaller disturbance of the geomagnetism. Accordingly, the corrected coordinate position of the center of the output circle tends to be unreliable so that the correction itself becomes meaningless.

SUMMARY OF THE INVENTION

Therefore, it is an object of the present invention to provide a system for measuring a traveling direction of a vehicle that can eliminate the above-noted defects inherent in the background art.

It is another object of the present invention to provide a system for measuring a traveling direction of a vehicle than can provide an accurate measurement of a traveling direction of the vehicle by correcting a coordinate position of a center of an output circle with high accuracy, but without requiring a vehicle driver to make any turn of the vehicle, irrespective of the condition of the disturbance of the environmental geomagnetism around the vehicle.

To accomplish the above-mentioned and other objects, according to one aspect of the present invention, a system comprises a geomagnetic sensor for sequentially deriving two directional component data of the geomagnetism around a vehicle, the two directions being orthogonal to each other on a horizontal plane, first means for deriving a traveling direction of the vehicle based on a direction toward a coordinate position defined by the two directional component data from a first coordinate position of a center of a corresponding output circle.

The system further comprises second means for deciding whether a magnetization level on a vehicle body is shifted from a first level to a second level based on the two directional component data, third means for storing a first group of the two directional component data, fourth means for storing a second group of the two directional component data, fifth means for deriving a second coordinate position as a preliminarily corrected value of the first coordinate position based on the first group of the data, the second coordinate position derived for the first magnetization level in response to a negative decision of the second means and sixth means for deriving a third coordinate position as a preliminarily corrected value of the first coordinate position based on the second group of the data, the third coordinate position derived for the second magnetization level in response to a positive decision of the second means.

The system further comprises seventh means for deriving a first value indicative of accuracy of the second or third coordinate position, eighth means for deriving a second value which is variable depending on a variation in the magnetization level on the vehicle body, and ninth means for calculating a fourth coordinate position as a finally corrected value of the first coordinate position based on the second or third coordinate position and a latest value of the fourth coordinate position, the latest value derived in a prior calculation executed by the ninth means, by changing a rate of displacement of the fourth coordinate position between the latest value and the second or third coordinate position, the rate determining a point of the fourth coordinate position between the latest value and the second or third coordinate position.

According to another aspect of the present invention, a system comprises a geomagnetic sensor for sequentially deriving two directional component data of the geomagnetism around a vehicle, the two directions being orthogonal to each other on a horizontal plane, first means for deriving a first traveling direction of the vehicle based on a direction toward a coordinate position defined by the two directional component data from a first coordinate position of a center of a corresponding output circle, second means for deriving a variation in a traveling direction of the vehicle based on data output from a non-geomagnetic second sensor, the second sensor outputting the data without being affected by the geomagnetism around the vehicle, and third means for deriving a second traveling direction of the vehicle based on the variation derived by the second means.

The system further comprises fourth means for deciding whether a magnetization level on a vehicle body is shifted from a first level to a second level based on the two directional component data, fifth means for storing a first group of the two directional component data, sixth means for storing a second group of the two directional component data, seventh means for storing a third group of the two directional component data and corresponding data of the second traveling direction of the vehicle, eighth means for deriving a second coordinate position as a preliminarily corrected value of the first coordinate position based on the first group of the data, the second coordinate position derived for the first magnetization level in response to a negative decision of the fourth means, ninth means for deriving a third coordinate position as a preliminarily corrected value of the first coordinate position based on the data stored in the seventh means, the third coordinate position derived for the second magnetization level in response to a positive decision of the fourth means, tenth means for deriving a first value indicative of accuracy of the second coordinate position, eleventh means for deriving a second value indicative of accuracy of the third coordinate position, twelfth means for deriving a fourth coordinate position as a preliminarily corrected value of the first coordinate position based on the second group of the data, the fourth coordinate position derived for the second magnetization level when the second value is less than a first predetermined level, thirteenth means for deriving a third value indicative of accuracy of the fourth coordinate position, and fourteenth means for deriving a fourth value which is variable depending on a variation in the magnetization level on the vehicle body.

The system further comprises fifteenth means for calculating a fifth coordinate position as a finally corrected value of the first coordinate position based on the second or third or fourth coordinate position and a latest value of the fifth coordinate position, the latest value derived in a prior calculation executed by the fifteenth means, by changing a rate of displacement of the fifth coordinate position between the latest value and the second or third or fourth coordinate position, the rate determining a point of the fifth coordinate position between the latest value and the second or third or fourth coordinate position.

BRIEF DESCRIPTION OF THE DRAWINGS

The present invention will be understood more fully from the detailed description given hereinbelow and from the accompanying drawings of the preferred embodiment of the invention, which are given by way of example only, and are not intended to be limitative of the present invention.

In the drawings:

FIG. 13 is a flowchart showing an interrupt routine to be executed per a predetermined distance by the arithmetic processing unit in the preferred embodiment of FIG. 1;

FIG. 14 is a flowchart showing an interrupt routine of a normal mode process to be executed by the arithmetic processing unit per a predetermined timing when new data enough for calculating a preliminary center position are collected;

FIG. 19 is a flowchart showing a subroutine of the magnetization mode process for deriving a preliminary center position and its calculation accuracy;

DESCRIPTION OF THE PREFERRED EMBODIMENT

Figure 1:
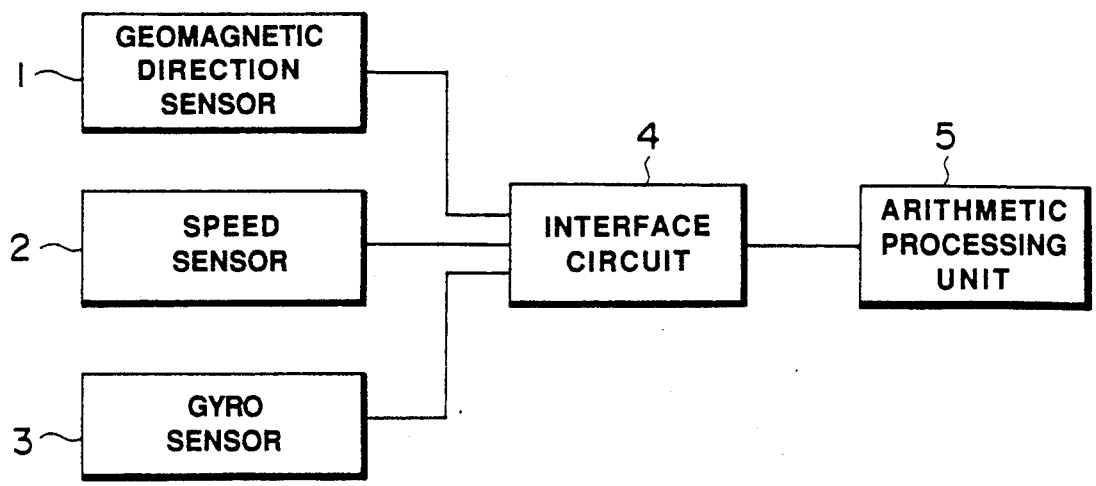
FIG. 1 is a schematic block diagram showing a preferred embodiment of the present invention.

Referring now to the drawings, a preferred embodiment of a vehicular traveling direction measuring system according to the present invention will be described with reference to FIGS. 1 to 23.

FIG. 1 shows a block diagram of the vehicular traveling direction measuring system of the preferred embodiment. In FIG. 1, the geomagnetic direction sensor 1, preferably of a flux gate type, resolves the geomagnetism into two directional components, the two directions being perpendicular to each other on a horizontal plane, and outputs the two directional component data in the form of electrical signals (VX, VY) indicative of a coordinate position on a X-Y coordinate plane. A vehicle speed sensor 2 outputs a count signal per a predetermined unit distance ΔD travelled by the vehicle. The gyro sensor 3 outputs a signal indicative of an angular velocity $\omega_G$ in a yawing direction of the vehicle. The gyro sensor 3 is replaceable by, such as, a steering angle sensor and a speed differential sensor which derives a difference in speed between right and left side wheels, as long as its output is not affected by the geomagnetic environment.

The output signals from the geomagnetic direction sensor 1, the speed sensor 2 and the gyro sensor 3 are respectively fed to an arithmetic processing unit 5 through an interface circuit 4. The processing unit 5 executes several calculation routines based on the input data to derive a traveling direction of the vehicle, which will be described later in detail.

Figure 2:
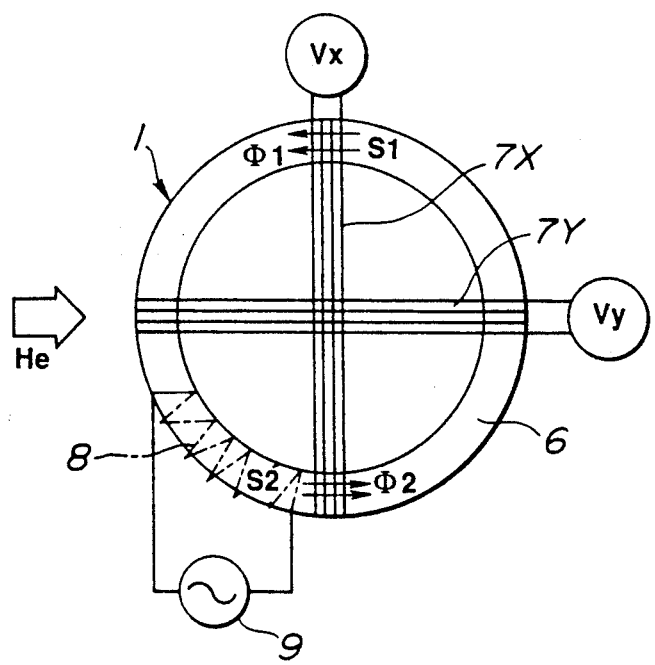
FIG. 2 is a schematic circuit wiring diagram of a geomagnetic direction sensor used in the preferred embodiment of FIG. 1.
Figure 3:
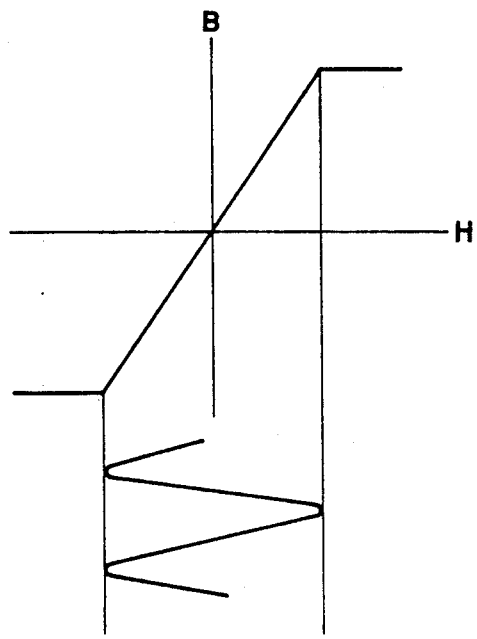
FIG. 3 is a graph of magnetic flux density B versus magnetic field H showing characteristics of energization of the geomagnetic direction sensor of FIG. 2.

FIG. 2 shows a structure of the geomagnetic direction sensor 1 used in the preferred embodiment. The geomagnetic direction sensor 1 includes an annular magnetic core 6 made of a permalloy and a pair of windings 7X, 7Y wound on the magnetic core 6. The windings 7X, 7Y are arranged in perpendicular to each other. Further, a winding 8 is wound on the magnetic core 6. The winding 8 is energized by a power supply 9 so as to energize the magnetic core 6 immediately before saturation as shown in FIG. 3.

Figure 4:
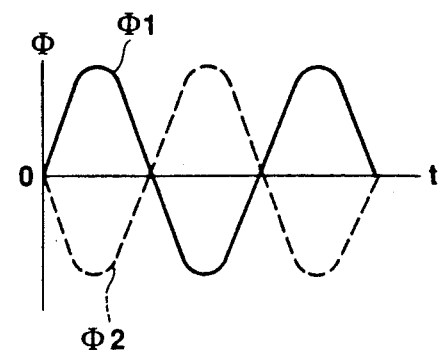
FIG. 4 is a graph of time versus magnetic flux showing a variation in magnetic flux on a permalloy core of the geomagnetic direction sensor under no application of the magnetic field.

When the geomagnetic direction sensor 1 is placed in a non-magnetic field with the power supplied to the winding 8, a magnetic flux $\phi_1$ and a magnetic flux $\phi_2$ passing through positions $S_1$ and $S_2$ of the permalloy core 6, respectively, have the same magnitudes but run in opposite directions to each other (180° out of phase with each other), as shown in FIG. 4. Accordingly, as the magnetic flux interlinked to the winding 7X becomes zero, its detecting voltage expressed by $V_x = N \, d\phi/dt$ (N denotes the number of turns of the winding), also becomes zero, and similarly, a detecting voltage $V_y$ of the winding 7Y also becomes zero.

Figure 5:
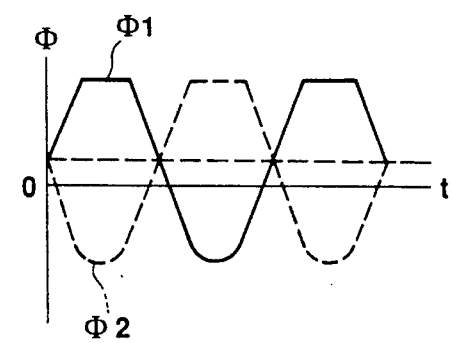
FIG. 5 is a graph of time versus magnetic flux showing a variation in magnetic flux on a permalloy core of the geomagnetic direction sensor under application of the magnetic field.
Figure 6:
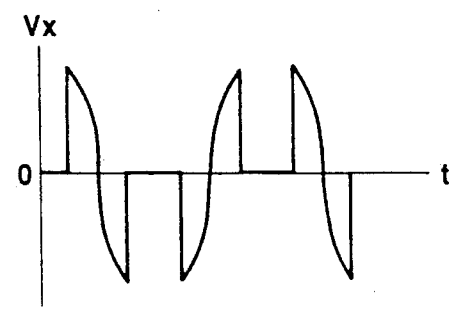
FIG. 6 is a graph of time versus detected voltage showing characteristics of the detected voltages.

Further, when the geomagnetic field He is applied in perpendicular to the winding 7X as shown in FIG. 2, a bias of the geomagnetic flux density expressed as $Be = \mu He$ ($\mu$ denotes a permeability of the permalloy core) is given to the magnetic flux in the magnetic core 6. Accordingly, the magnetic flux $\phi_1$ and $\phi_2$ becomes asymmetrical as shown in FIG. 5, so that the winding 7X derives the detecting voltage $V_x$ of a waveform as shown in FIG. 6.

On the other hand, because the geomagnetic field He is parallel to the winding 7Y in FIG. 2, no geomagnetic field is interlinked with the winding 7Y so that no voltage $V_y$ is generated in the winding 7Y.

Figure 7:
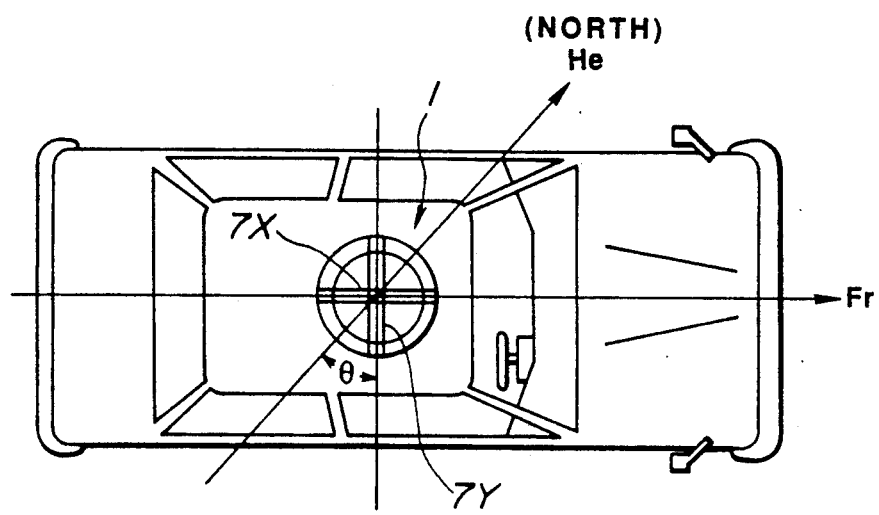
FIG. 7 is a schematic plan view of a vehicle incorporated with the geomagnetic direction sensor of FIG. 2 to explain a traveling direction of the vehicle.
Figure 8:
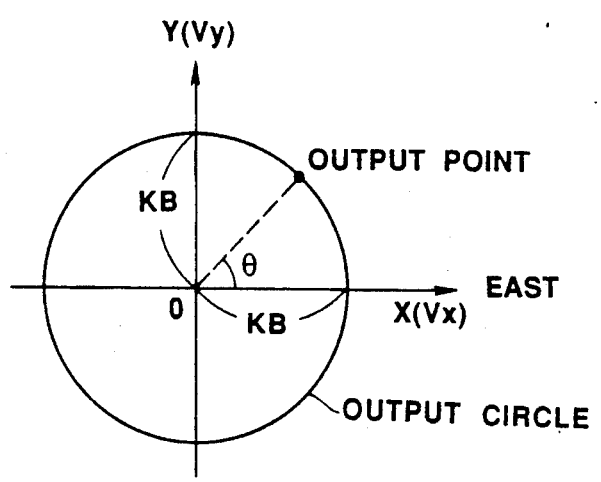
FIG. 8 is an explanatory view of an output circle derived by outputs of the geomagnetic direction sensor.

The geomagnetic direction sensor 1 is mounted on the vehicle in a horizontal posture as shown in FIG. 7. For example, when the geomagnetic field He is applied to both of the windings 7X, 7Y, the detected voltages $V_x$ and $V_y$ (output values) are respectively derived at the windings 7X, 7Y according to the geomagnetic field, as shown in FIG. 8.

The detected voltages $V_x$, $V_y$ are expressed by the following equations (1) and (2) provided that a value K is a winding constant and a value B is a horizontal component of the geomagnetism He.

$$V_x = KB \cos \phi \qquad (1)$$

$$V_y = KB \sin \theta \qquad (2)$$

Accordingly, an angle $\theta$ of a traveling direction of the vehicle with respect to a width direction of the vehicle body is expressed by the following equation (3).

$$\theta = \tan^{-1}(V_x/V_y) \qquad (3)$$

As appreciated from the equations (1) and (2), when the vehicle makes one turn under the uniform geomagnetic field He, an output circle is described on the X-Y coordinate plane based on a coordinate position defined by the detected voltages $V_x$ and $V_y$, as shown in FIG. 8. The output circle is expressed by the following equation (4).

$$V_x^2 + V_y^2 = (KB)^2 \qquad (4)$$

Accordingly, because the coordinate position defined by the detected voltages $V_x$, $V_y$ falls on the output circle, a direction from the center 0 of the output circle toward the coordinate position (an output point shown in FIG. 8) is derived by the arithmetic processing unit 5 as a traveling direction of the vehicle.

Figure 9:
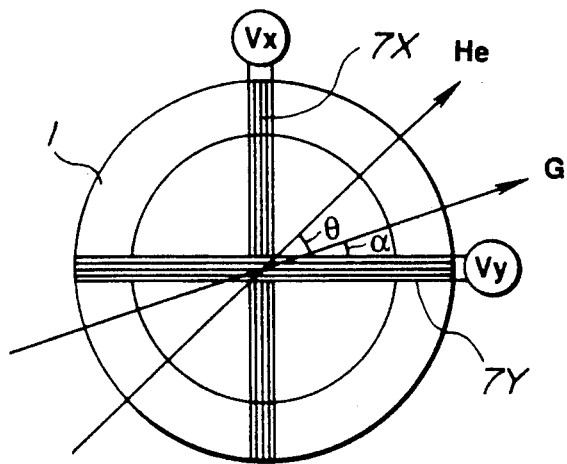
FIG. 9 is an explanatory view showing the geomagnetic direction sensor, wherein a magnetic field other than the geomagnetic field is applied to the geomagnetic direction sensor in addition to the geomagnetic field.
Figure 10:
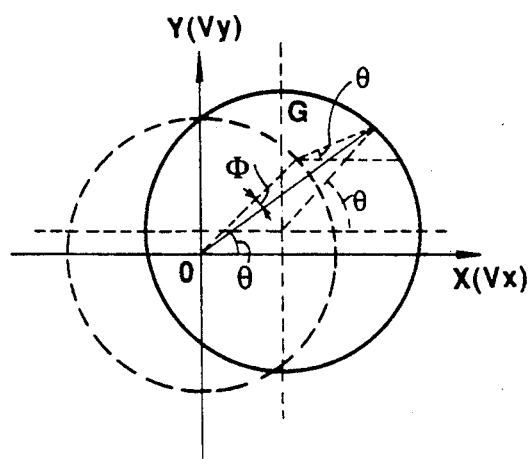
FIG. 10 is an explanatory view showing a displacement of the output circle due to magnetization on the vehicle body.

Assuming that the vehicle is magnetized, an additional magnetic field G is generated and interlinked with the windings 7X, 7Y along with the geomagnetism He, as shown in FIG. 9. Accordingly, the output circle is moved from a broken line position to a solid line position, as shown in FIG. 10. Consequently, the traveling direction of the vehicle derived by the processing unit 5 inevitably includes an error because a coordinate position derived after the magnetization on the vehicle body does not fall on the output circle derived before the vehicle magnetization.

In order to correct the above-noted measurement error, the processing unit 5 executes a below-described process for deriving a corrected coordinate position of the center of a corresponding output circle.

A general operation of the preferred embodiment will be described hereinbelow with reference to FIG. 11 which shows a general flowchart to be executed by the processing unit 5 for deriving a corrected center coordinate position of a corresponding output circle.

In a first step 100, it is determined whether the vehicle is magnetized. This determination is executed based on the input data in the form of the output values $V_x$ and $V_y$ fed from the geomagnetic sensor 1 and stored in an annular buffer A which will be described later. Specifically, when the disturbance of the environmental geomagnetism large enough to magnetize the vehicle occurs, the output values $V_x$, $V_y$ of the geomagnetic direction sensor 1 abruptly varies. Accordingly, by calculating the variation between the output values $V_x$, $V_y$ and comparing it with a predetermined threshold level, it is determined whether the vehicle is magnetized or whether the vehicle is shifted to a new magnetization level. In other words, the processing unit 5 determines whether a magnetization level including zero level is shifted from a current level to a new magnetization level. In order to derive an accurate determination whether the shift of the magnetization level occurs, the processing unit 5, for example, first calculates an average value of a predetermined number (for example, 20) of $V_x$ stored in the annular buffer A and an average value of a predetermined number (for example, 20) of $V_y$ stored in the annular buffer A. Then, the processing unit 5 calculates a distance between a coordinate position defined by newly input $V_x$ and $V_y$ and a coordinate position defined by the average values. When the calculated distance is above a predetermined level, the processing unit 5 determines that the vehicle is magnetized to a new magnetization level.

The details of the process for yielding the above-noted determination are disclosed in Japanese First Patent Publication No. 64-46612 published on February 21, 1989 and in W. German Patent Application No. P 40 00 345.0 filed on January 8, 1990, the contents of which are incorporated by reference for the sake of disclosure.

If the decision at the step 100 is NO, i.e. there is no possibility of the substantial shift of the magnetization level, the routine goes to a step 102 where a condition of a mode flag is checked. If the mode flag is not set at 1, i.e. being set at 0, then the routine goes to a step 104 where a normal mode process is executed. On the other hand, if the mode flag is set at 1, then the routine goes to a step 106 where a magnetization mode process is executed.

In the normal mode process at the step 104, a preliminary coordinate position of a center of a corresponding output circle as well as its calculation accuracy are derived, which will be described later in detail. At a step 108, it is checked whether the above-noted preliminary coordinate position and its calculation accuracy are derived at the step 104. If YES, then the routine goes to a step 110 where the mode flag is cleared to zero in the case of the normal mode process, because the mode flag is set at 0 at the step 102, the mode flag is remained 0 at the step 116 and further goes to a step 112 where a finally corrected value indicative of the center coordinate position is derived based on the above-noted preliminary center position and the calculation accuracy, which will be also described later in detail.

On the other hand, if the decision at the step 100 is YES, i.e. there is a possibility of the substantial shift of the magnetization level, the routine goes to a step 114 where an initialize routine is executed, which will be described later in detail, and then goes to a step 116 where the mode flag is set to 1. Subsequently, the routine returns to the step 100.

If the decision at the step 100 is NO, then the routine goes to the step 102. This time, because the mode flag has been set to 1 at the step 116, the routine goes to the step 106 where a preliminary coordinate position of a center of a corresponding output circle as well as its calculation accuracy are derived, which will be described later in detail. At the step 108, it is checked, similarly for the normal mode process, whether the above-noted preliminary center position and its calculation accuracy are derived at the step 106. If YES, then the routine goes to the step 110 where the mode flag is cleared to zero, and further goes to the step 112 where a finally corrected value indicative of the center position is derived based on the above-noted preliminary center position and the calculation accuracy, which will be also described later in detail.

On the other hand, if the decision at the step 100 is again YES, then the steps 114 and 116 are repeated until the decision at the step 100 becomes NO. This is likely to happen when the vehicle successively passes through a plurality of railroad crossings.

Figure 12:
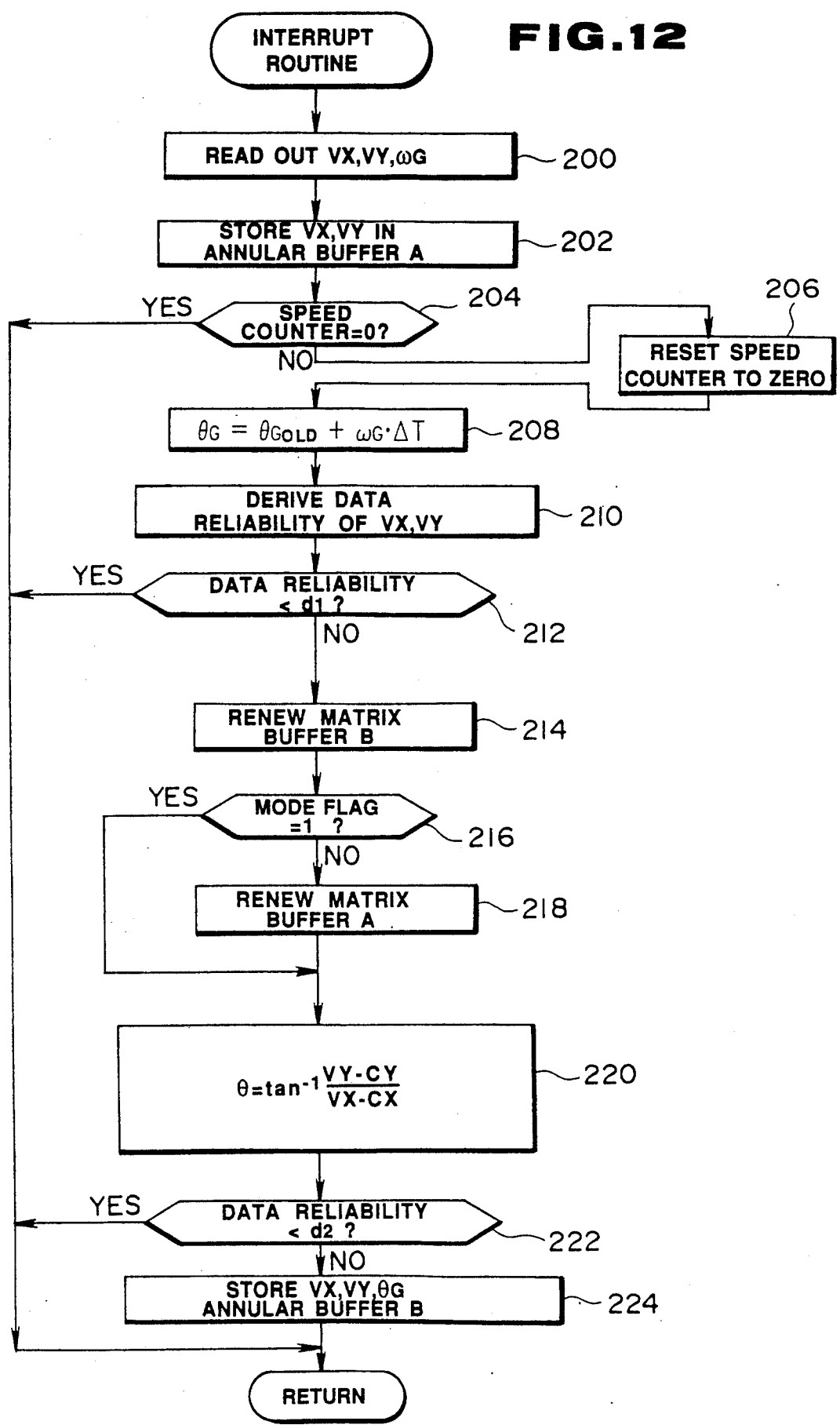
FIG. 12 is a flowchart showing an interrupt routine to be executed per a predetermined time by the arithmetic processing unit in the preferred embodiment of FIG. 1.

FIG. 12 shows a flowchart of an interrupt routine which is executed per a predetermined unit time $\Delta T$, for example, every 100 msec.

At a step 200, the output values $V_x$, $V_y$ derived by the geomagnetic sensor 1 and an angular velocity $\omega_G$ in a yawing direction of the vehicle derived by the gyro sensor 3 are read out every $\Delta T$. At a step 202, the output values $V_x$, $V_y$ read out at the step 200 are stored in the annular buffer A. The annular buffer A sequentially stores a predetermined number (for example, 20) of a pair of the output values $BV_x$, $V_y$. When a new pair of the output values is stored, the oldest pair of the output values is discarded. Accordingly, the annular buffer A always stores the predetermined number of the newest pairs of the output values $V_x$, $V_y$. The geomagnetic data stored in the annular buffer A are used at the step 100 in FIG. 11 for determining whether the magnetization level is shifted, as described before.

Before going to a step 204, an interrupt routine for counting up a speed counter is explained with reference to FIG. 13. This interrupt routine is executed per a predetermined distance $\Delta D$ travelled by the vehicle. Specifically, if the speed sensor 2 outputs 24 pulses per one rotation of a vehicle tire, then $\Delta D$ is, for example, 6 to 7 centimeters, which however is variable according to an outer diameter of the tire, and the interrupt routine is executed 24 times per one rotation of the tire. At a step 300, the speed counter is counted up by 1 per every execution of the interrupt routine and is used at the step 204 in FIG. 12 for determining whether the vehicle is stopped. Specifically, when a value of the speed counter is zero, then it is determined that the vehicle is stopped.

Referring back to the step 204 in FIG. 12, when the answer at the step 204 is YES, i.e. the vehicle is stopped, then subsequent processes are not executed in order to avoid collections of the data while the vehicle is stopped. This is because if the data are collected during the vehicle being stopped, weight of these data increases when calculating the corrected center position so that the correction of the center position can not be effectively performed.

On the other hand, if the answer at the step 204 is NO, i.e. the vehicle is running, the routine goes to a step 206 where the speed counter is reset to zero for a subsequent execution of this interrupt routine. At a step 208, a gyro direction $\theta_G$ is derived by the following equation (5).

$$\theta_G = \theta_{GOLD} + \omega_G \times \Delta T \quad (5)$$

wherein, $\theta_{GOLD}$ is $\theta_G$ which has been obtained during the prior execution of the interrupt routine based on the outputs from the gyro sensor and stored in an annular buffer B at a step 224.

Next, the routine goes to a step 210 where a reliability of the data $V_x$, $V_y$ is derived. Specifically, the output data $V_x$, $V_y$ includes not only the regular geomagnetism components but also irregular components generated due to the disturbance of the geomagnetism around the vehicle. Naturally, these irregular components become an obstacle against the precise measurement of the vehicle traveling direction. Accordingly, by estimating an amount of the disturbance, the data reliability can be derived such that as the amount of the disturbance is estimated less, the data reliability is assumed higher.

The estimation of the disturbance amount is performed for example, by using a combination of the geomagnetic direction sensor 1 and the gyro sensor 3. The geomagnetic direction sensor 1 is capable of deriving an absolute traveling direction of the vehicle while its output is affected by the magnetism environment. The gyro sensor 3 is capable of deriving a variation in the traveling direction of the vehicle by integration of the angular velocity and accumulation thereof without being affected by the magnetic environment. The followings are examples how to derive the estimation of the disturbance amount.

(1) A variation in a direction derived by outputs from the gyro sensor 3 and a variation in a direction derived by outputs from the geomagnetic direction sensor 1 are compared to estimate the amount of the disturbance larger as a difference between two variations is larger. This is based on the fact that though the output of the gyro sensor 3 includes a drift error, it is considered to be accurate for a short time, i.e. for a small variation.

(2) A first distance travelled by the vehicle for $\Delta T$ between time points $t_1$ and $t_2$ is derived by $\Delta\theta_G \times R$, wherein $\Delta\theta_G$ is a variation in a vehicle traveling direction for $\Delta T$ derived by the outputs from the gyro sensor 3 and R is a radius of a corresponding output circle. Next, a second distance travelled by the vehicle for $\Delta T$ between the time points $t_1$ and $t_2$ is derived by the following equation (6).

$$\{(V_{x1}-V_{x2})^2 + (V_{y1}-V_{y2})^2\}^{\frac{1}{2}} \quad (6)$$

wherein, $(v_{x1}, V_{y1})$ is an output value at the time point $t_1$ derived by the geomagnetic direction sensor, and $(V_{x2}, V_{y2})$ is an output value at the time point $t_2$ derived by the geomagnetic directional sensor.

The first and second distances are compared to estimate the amount of the disturbance larger as a difference between the first and second distances becomes larger.

Further details are disclosed in Japanese Patent Application No. 63-211967 contents of which are hereby incorporated by reference for the sake of disclosure.

Then, at a step 212, the data reliability is compared with a predetermined value $\alpha_1$. If an answer at the step 212 is YES, i.e. the data reliability is less than the predetermined value, the subsequent process is not executed. If the answer at the step 212 is NO, i.e. the data reliability is no less than the predetermined value, the routine goes to a step 214 where a matrix buffer B is renewed.

At a step 216, it is checked whether the mode flag is set at 1. If an answer is NO, a matrix buffer A is also renewed at a step 218. If the answer is YES, the matrix buffer A is not renewed.

Figure 21:
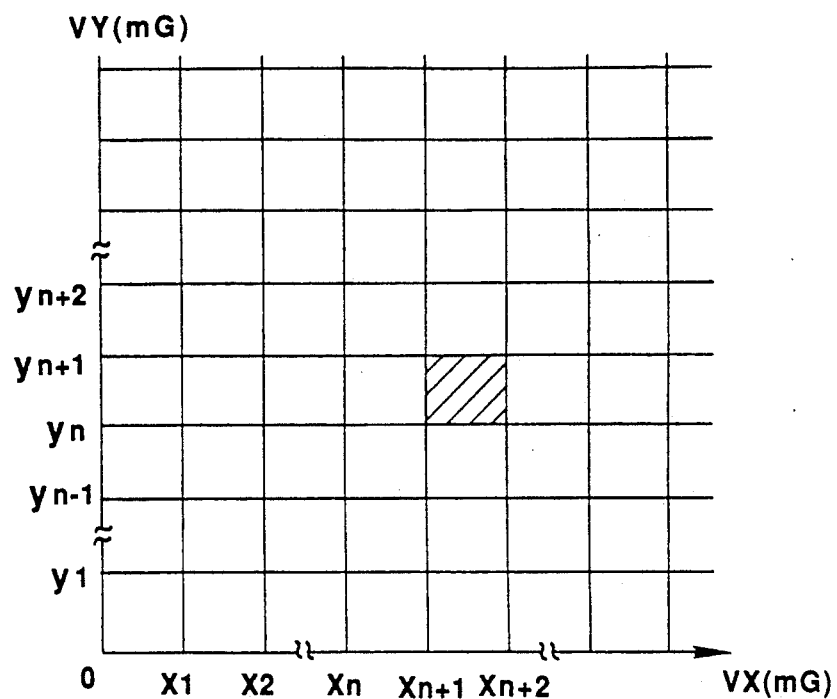
FIG. 21 is an explanatory view for explaining a matrix buffer.

Before going to a step 220, explanation will be given hereinbelow for the matrix buffers A and B with reference to FIG. 21.

Each matrix buffer has a $V_x$-$V_y$ coordinate plane which is partitioned into a plurality of sections similar to a lattice pattern, and each section has a counter. Assuming that an X coordinate value $V_x$ derived by the geomagnetic directional sensor 1 falls within a range of $x_{n+1}$ to $x_{n+2}$ and a corresponding Y coordinate value $V_y$ falls within a range of $y_n$ to $y_{n+1}$, the counter for the hatched section is counted up according to the foregoing data reliability. Accordingly, a value of the counter becomes larger with a higher reliability of the data and with a larger number of times of the corresponding section to be matched with the input data.

The matrix buffer A is used for the normal mode process and the matrix buffer B is used for the magnetization mode process, which will be described later.

Figure 16:
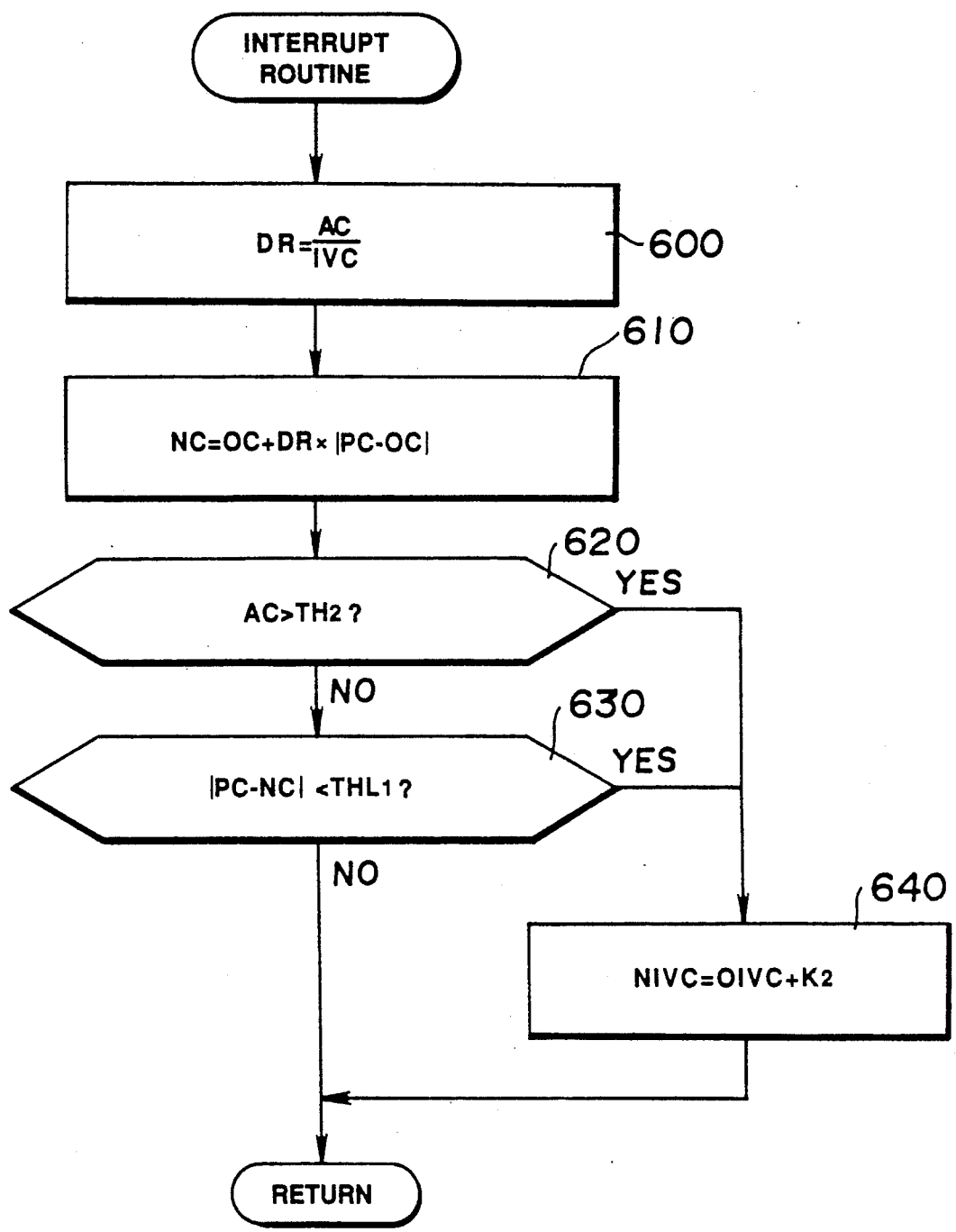
FIG. 16 is a flowchart showing an interrupt routine for deriving a new center position of a corresponding output circle.

Referring back to FIG. 12, at the step 220, a traveling direction $\theta$ of the vehicle is calculated by the following equation (7).

$$\theta = \tan^{-1}\frac{V_y - C_y}{V_x - C_x} \quad (7)$$

wherein, $C_x$ and $C_y$ are X and Y coordinate values of a center of an output circle derived by a prior execution of a center position correction routine as shown in FIG. 16, which will be described later.

The traveling direction $\theta$ derived at the step 220 is used at a step 400 in FIG. 14 for determining a timing of starting the execution of the normal mode process.

Next, at a step 222, the data reliability derived at the step 210 is compared with another predetermined value $\alpha_2$ which is set larger than the predetermined value $\alpha_1$. If a decision at the step 222 is NO, i.e. the data reliability is above the predetermined value $\alpha_2$, the output value $V_x$, $V_y$ and the corresponding $\theta_G$ derived at the step 208 are stored in the annular buffer B at a step 224. Similar to the annular buffer A, the annular buffer B stores a predetermined number of the sequentially derived data sets. The data stored in the annular buffer B is used in the magnetization mode process for deriving the preliminary center coordinate position and its calculation accuracy, which will be described later in detail.

Now, the normal mode process will be described hereinbelow with reference to FIG. 14.

At the first step 400, a current traveling direction $\theta$ derived at the step 220 in FIG. 12 is compared with an old traveling direction $\theta_{OLD1}$ stored at a step 430 in a prior execution of the normal mode process. If a difference between 25 the directions $\theta$ and $\theta_{OLD1}$ is larger than a given threshold level $THD_1$ which is, for example, $THD_1 = 100°$, a preliminary coordinate position PC of the corresponding output circle is calculated at a step 410, and further, a calculation accuracy AC of the preliminary center position PC derived at the step 410 is derived at a step 420, based on the data stored in the matrix buffer A. The matrix buffer A stores all the data during traveling of the vehicle except for those data to be erased in the magnetization mode process, which will be described later. Then, at the step 430, the current traveling direction $\theta$ is stored as $\theta_{OLD1}$ for a subsequent execution of the normal mode process.

On the other hand, if the answer at the step 400 is NO, i.e. the difference between the directions $\theta$ and $\theta_{OLD1}$ is less than the given threshold level $THD_1$, the subsequent steps as mentioned above are not executed in order to avoid the calculation of the preliminary center value without new data enough for the calculation thereof.

It is to be noted that when power is first applied to the arithmetic processing unit 5, the old traveling direction $\theta_{OLD1}$ is initialized to a traveling direction derived at the step 220 at the time of the initialization.

Now, the details of the steps 410 and 420 will be described hereinbelow with reference to FIG. 15.

At a first step 500, $V_{xo}$ and $V_{yo}$ are respectively initialized to $C_x$ and $C_y$. $C_x$ and $C_y$ are virtual X and Y coordinate values of a center of an output circle derived by the data stored in the matrix buffer A based on a premise that a circle is described by the data stored in the matrix buffer A.

For example, $C_x$ and $C_y$ are derived by the following equation.

$$C_x = \sum_{k=1}^{i} V_{xk}/i$$

$$C_y = \sum_{k=1}^{i} V_{yk}/i$$

wherein, i denotes the number of X and Y coordinate values, respectively, derived by the geomagnetic sensor 1.

At the first step 500, a virtual radius $R_o$ of the output circle having its center value of $V_{xo}$ and $V_{yo}$, is also initialized to 300 mG (milligauss) which is an average output value of the geomagnetism.

Through subsequent steps 510 to 560, the preliminary center coordinate position is calculated using the method of least squares.

Specifically, a distance Ri between the virtual center coordinate position ($V_{xo}$, $V_{yo}$) and a coordinate position ($V_{xi}$, $V_{yi}$) derived by the output of the geomagnetic sensor 1 is calculated by the following equation (8).

$$Ri = [\{V_{xi}-V_{xo}\}^2 + \{V_{yi}-V_{yo}\}^2]^{\frac{1}{2}} \quad (8)$$

Accordingly, a value J according to the method of least squares is derived by the following equation (9) at the step 510.

$$J = \sum_{k=1}^{i} [\{(V_{xk}-V_{xo})^2 + (V_{yk}-V_{yo})^2\}^{\frac{1}{2}} - R_o]^2 \quad (9)$$

According to the method of least squares, by deriving values of $V_{xo}$, $V_{yo}$ and $R_o$ which make the value J the least, the corrected values of $C_x$ and $C_y$ can be obtained.

At the subsequent step 520, partial derivatives of J with respect to $V_{xo}$, $V_{yo}$ and $R_o$ are respectively derived.

In order to derive the values of $V_{xo}$, $V_{yo}$ and $R_o$ which render the value J the least, the following condition should be satisfied.

$$f_1 \equiv \frac{\delta J}{\delta V_{xo}} = \Sigma \left\{ 1 - \frac{R_o}{\sqrt{(V_{xi}-V_{xo})^2 + (V_{yi}-V_{yo})^2}} \right\} \times (V_{xi}-V_{xo}) = 0 \quad (10)$$

$$f_2 \equiv \frac{\delta J}{\delta V_{yo}} = \Sigma \left\{ 1 - \frac{R_o}{\sqrt{(V_{xi}-V_{xo})^2 + (V_{yi}-V_{yo})^2}} \right\} \times (V_{yi}-V_{yo}) = 0 \quad (11)$$

$$f_3 \equiv \frac{\delta J}{\delta R_o} = \Sigma\{\sqrt{(V_{xi}-V_{xo})^2 + (V_{yi}-V_{yo})^2} - R_o\} = 0 \quad (12)$$

By deriving values of $V_{xo}$, $V_{yo}$ and $R_o$ which satisfy the equations (10), (11) and (12), a coordinate position defined by the derived $V_{xo}$ and $V_{yo}$ becomes the corrected preliminary center value PC.

However, it is impossible to derive the values of $V_{xo}$, $V_{yo}$ and $R_o$ which satisfy the equations (10), (11) and (12). In view of this, the present preferred embodiment utilizes Newton-Raphson's method at the step 530. At the step 530, correction values h, m and f are derived by the following equations (13), (14), (15) and (16).

$$h = \frac{\begin{vmatrix} -f_1 & f_1 V_{yo} & f_1 R_o \\ -f_2 & f_2 V_{yo} & f_2 R_o \\ -f_3 & f_3 V_{yo} & f_3 R_o \end{vmatrix}}{H} \quad (13)$$

$$m = \frac{\begin{vmatrix} f_1 V_{xo} & -f_1 & f_1 R_o \\ f_2 V_{xo} & -f_2 & f_2 R_o \\ f_3 V_{xo} & -f_3 & f_3 R_o \end{vmatrix}}{H} \quad (14)$$

$$l = \frac{\begin{vmatrix} f_1 V_{xo} & f_1 V_{yo} & -f_1 \\ f_2 V_{xo} & f_2 V_{yo} & -f_2 \\ f_3 V_{xo} & f_3 V_{yo} & -f_3 \end{vmatrix}}{H} \quad (15)$$

$$H \equiv \begin{vmatrix} f_1 V_{xo} & f_1 V_{yo} & f_1 R_o \\ f_2 V_{xo} & f_2 V_{yo} & f_2 R_o \\ f_3 V_{xo} & f_3 V_{yo} & f_3 R_o \end{vmatrix} \quad (16)$$

wherein, $giz = \delta gi/\delta z$.

At the subsequent step 540, the correction values are compared with predetermined reference values $R_1$, $R_2$ and $R_3$, respectively. If a decision at the step 540 is YES, i.e. all the correction values are no more than the corresponding reference values, then the X and Y coordinate values $V_{xo}$ and $V_{yo}$ derived at the step 500 are set as the corrected preliminary center position PC at the step 560.

On the other hand, if any one of the three correction values is decided above the corresponding reference value at the step 540, the correction value h is added to $v_{xo}$, the correction value l is added to $v_{yo}$, and the correction value m is added to $R_o$ at the step 550. In this case, the steps 520 to 540 are repeated until each of the correction values becomes no more than the corresponding reference value.

The details of deriving the preliminary center position is disclosed in Japanese First Utility Model Publication No. 1-144814 published on Oct. 4, 1989, the contents of which are incorporated hereby by reference for the sake of disclosure.

Subsequently, at a step 570, the accuracy of calculation AC of the preliminary center coordinate position derived at the step 560 is calculated. This calculation of the accuracy is derived by using a function f(J) with respect to the value J. A value of the function f(J) gets less as the correction values h, m, l get larger, and is given in a range of 0 to 1.

Now, the correction routine for deriving a new or finally corrected center position referred to at the step 112 in FIG. 11 will be described in detail with reference to FIG. 16.

At a first step 500, an interior division rate DR is derived by the following equation (17).

$$DR = AC/IVC \qquad (17)$$

wherein, Ac denotes the calculation accuracy derived at the step 570 in FIG. 15, and IVC denotes a coefficient which is variable based on a variation in the magnetization level on the vehicle body, which will be described later in detail.

The interior division rate DR is a coefficient for determining to what point between the preliminarily center position PC and a latest center position OC derived by a previous execution of the center position correction routine, a new center position NC should be approached. In other words, the interior division rate DR determines a point of the new center position between the preliminarily center position PC and the latest center position OC.

It is to be noted that the calculation accuracy is given, as mentioned above, within the range of 0 to 1, and the coefficient IVC is given no less than a value 1, which will be described later. Accordingly, the interior division rate DR is given in a range 0 to 1.

Figure 15:
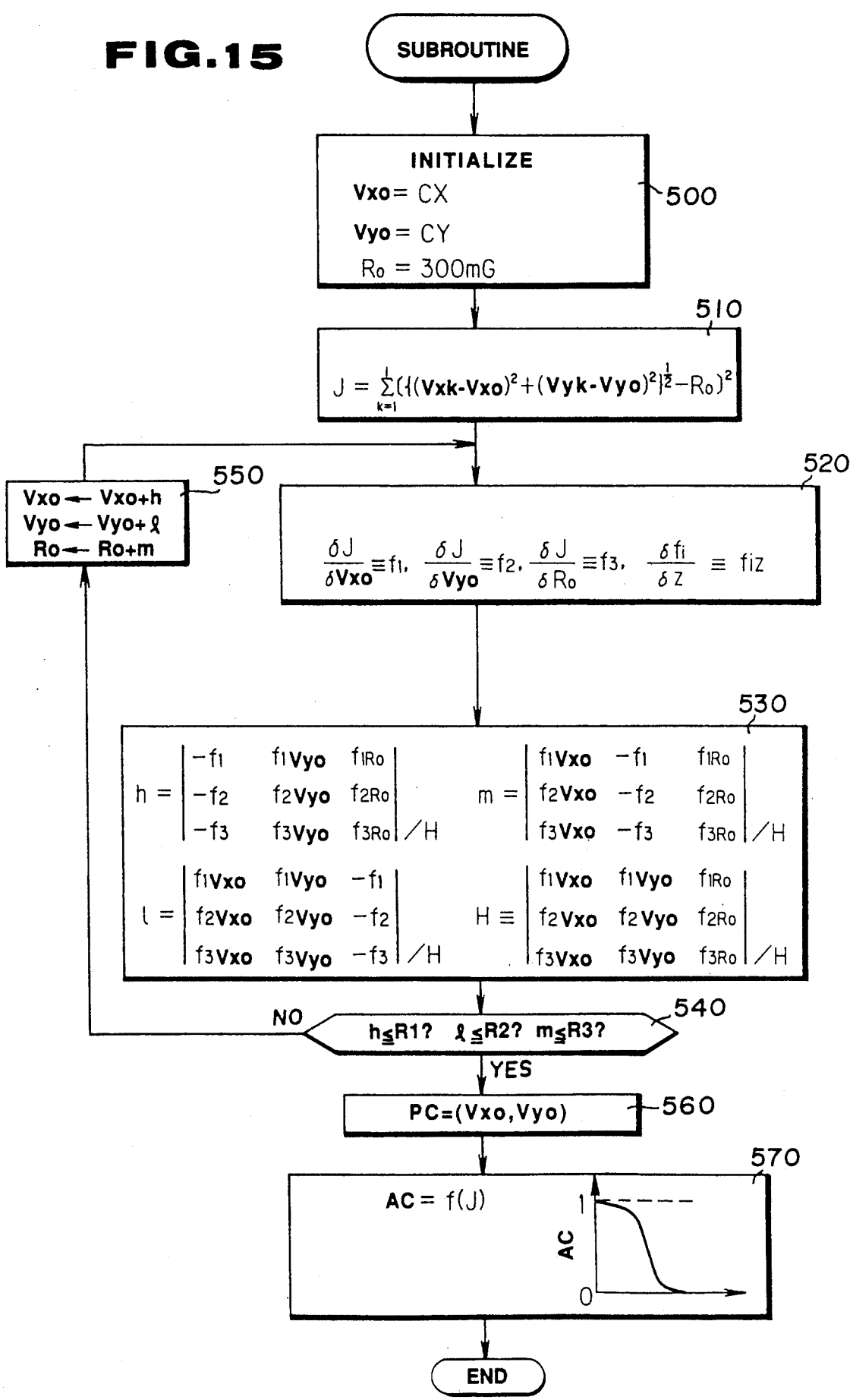
FIG. 15 is a flowchart showing a subroutine of a normal mode process and a magnetization mode process for deriving a preliminary center position and its calculation accuracy.

Subsequently, at a step 610, the new center position NC is derived by the following equation (18).

$$NC = OC + DR \times |PC - OC| \qquad (18)$$

wherein, OC denotes the latest cent position derived by a previous execution of the center position correction routine, DR denotes the interior division rate, and PC denotes the preliminary center position derived at the step 560 in FIG. 15.

Figure 22:
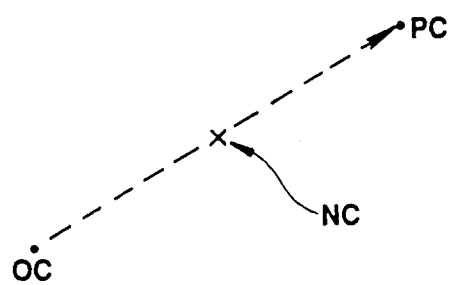
FIG. 22 is an explanatory view for explaining how to derive a new center position using an interior division rate.

As understood from the equation (18), the new center position NC approaches closer to the preliminary center position PC from the latest center position OC with a larger value of the interior division rate DR, as clearly shown in FIG. 22.

Subsequently, the coefficient IvC is increased when conditions of steps 620 and 630 are satisfied. Specifically, if the calculation accuracy AC derived at the step 570 in FIG. 15 is decided to be larger than a predetermined threshold level TH$_2$ at the step 620, and an absolute difference between the preliminary center position PC and the new center position NC is decided to be less than a predetermined threshold level THL$_1$, a new coefficient NIVC is derived by the following equation (19).

$$NIVC = OIVC + K_2 \qquad (19)$$

wherein, K$_2$ is a set constant, and OIVC denotes latest coefficient IVC derived at the step 640 in a prior execution of the center position correction routine and used at the foregoing step 600 in the current execution of this correction routine, or a latest coefficient IVC used at the step 600 both in the prior and current execution of the center position correction routine in which the increment of the coefficient IVC at the step 640 was not executed in the prior execution the center position correction routine.

Accordingly, when reliable preliminary center positions are continuously obtained through sequential executions of the normal mode process, the coefficient IVC gets considerably large through sequential executions of the center position correction routine. Therefore, even if the vehicle travels across the bad geomagnetic environment, i.e. under the geomagnetic disturbance not large enough to magnetize the vehicle, after having travelled long in the good geomagnetic environment, so that the preliminary center position calculated deviates from the latest center position derived through a prior execution of the center position correction routine, the new center position does not move substantially because the coefficient IVC at the step 600 is considerably large to make the interior division rate at the step 610 considerably small. Accordingly, a reliable and stable measurement of the vehicle traveling direction is attained.

It is to be appreciated that when the power is first applied to the arithmetic processing unit 5, the coefficient IVC is initialized to a given proper value.

Now, a center position correction system through the magnetization mode process will be described hereinbelow with reference to FIGS. 16 to 19.

Figure 11:
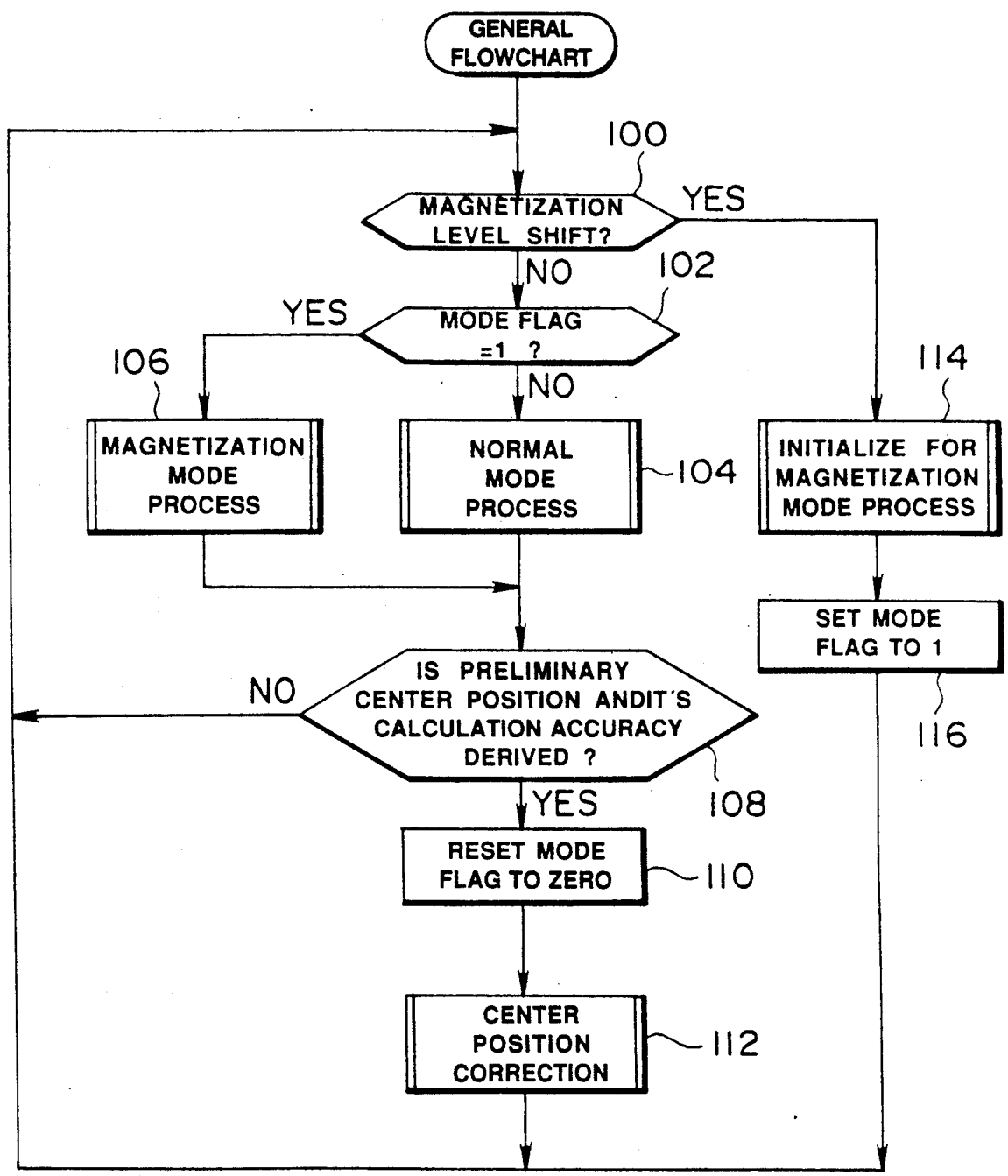
FIG. 11 is a general flowchart to be executed by an arithmetic processing unit in the preferred embodiment of FIG. 1 for deriving a new center position of a corresponding output circle.
Figure 17:
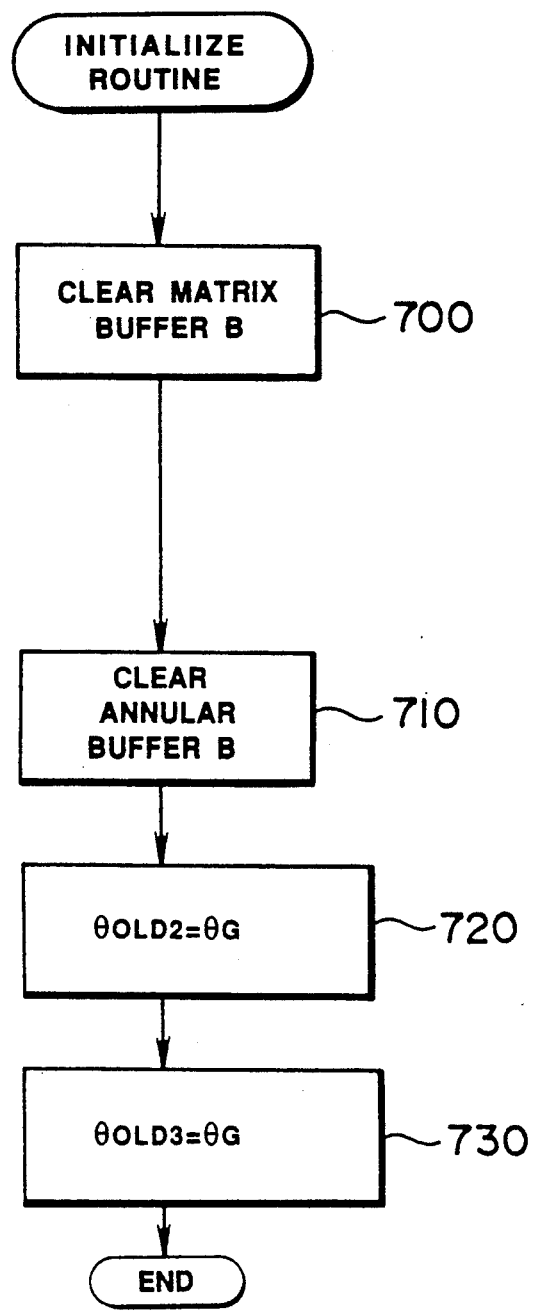
FIG. 17 is a flowchart showing a subroutine of initialization for a magnetization mode process.

FIG. 17 shows the initialize routine for the magnetization mode process as mentioned at step 114 in FIG. 11.

As described above, in the magnetization mode process, the calculation of the preliminary center position is executed based on only those data derived after the positive decision at the step 100 that the magnetization level is shifted. Accordingly, in this initialize routine, the data stored in the matrix buffer B and the annular buffer B are erased through respective steps 700 and 710. Subsequently, a traveling direction $\theta_G$ derived at the step 208 in FIG. 12 at the time of this initialization is stored as $\theta_{OLD2}$ at a step 720 and as $\theta_{OLD3}$ at a step 730. Accordingly, $\theta_{OLD2}$ equals $\theta_{OLD3}$ at the time of the initialization.

After the initialization is executed, the mode flag is set to 1 at the step 116 in FIG. 11 and then the routine goes to the magnetization mode process if the answer at the step 100 is NO, i.e. the possibility of occurrence of a further magnetization level shift is determined negative.

Figure 18A:
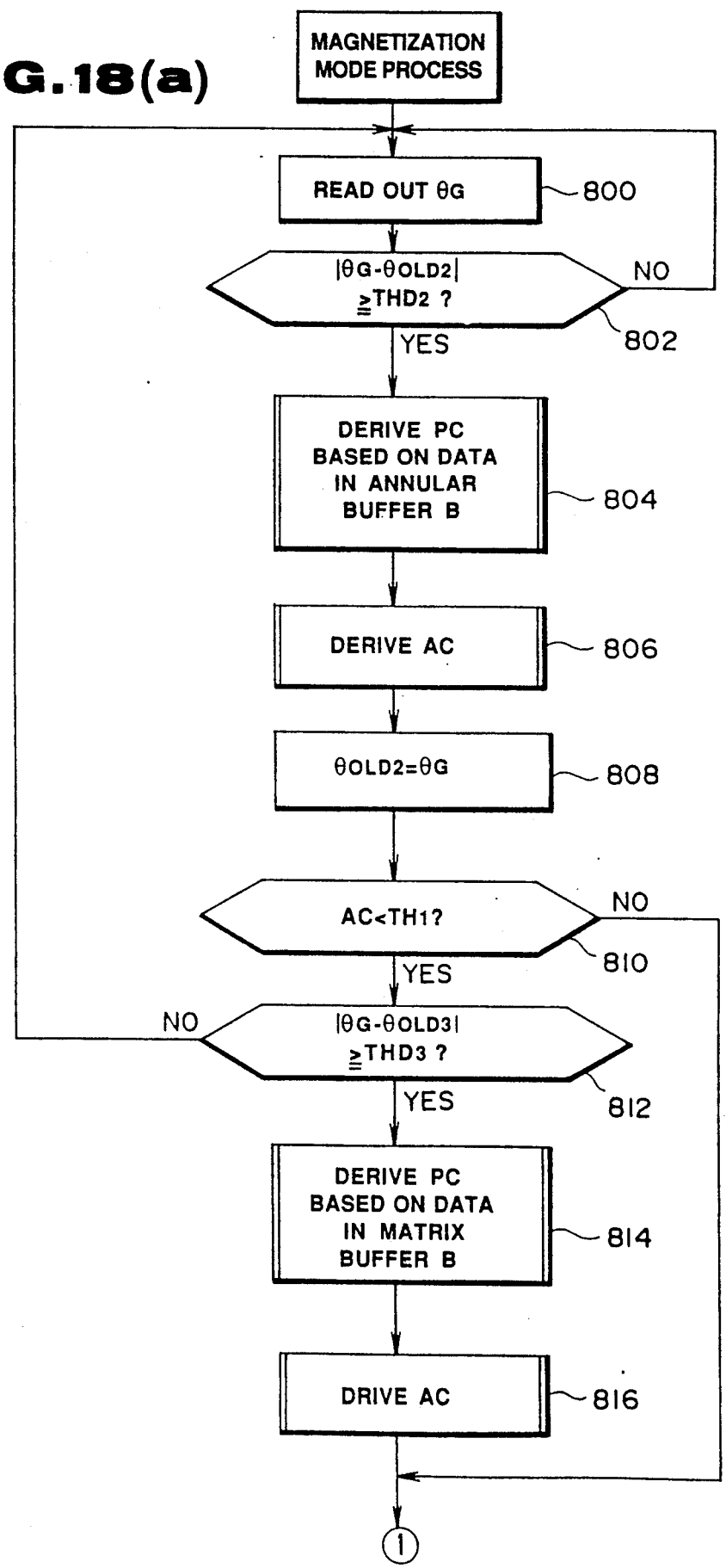
FIG. 18(a) and FIG. 18(b) are a flowchart showing an interrupt routine of a magnetization mode process to be executed by a predetermined timing when new data enough for calculating a preliminary center position are collected.

FIGS. 18(a); and 18(b) show the magnetization mode process referred to at the step 106 in FIG. 11.

At a first step 800, a current traveling direction $\theta_G$ derived at the step 208 in FIG. 12 is read out. Then, at a step 802, a difference between the current traveling direction $\theta_G$ and the traveling direction $\theta_{OLD2}$ stored at the step 720 in FIG. 17 is compared with a predetermined threshold level THD$_2$ which is set, for example, to 10°. If an answer at the step 802 is YES, i.e. the difference is larger than the threshold level THD$_2$, then the routine goes to a subsequent process. On the other hand, if the answer at the step 802 is NO, then the routine returns to the step 800 to repeat the steps 800 and 802 in order to avoid the subsequent calculations without new data not enough for the calculations thereof, similar to the step 400 in FIG. 14.

It is to be noted that, at the step 802, a variation in the traveling direction is derived by the output data from the gyro sensor, while, in the normal process mode, the variation in the traveling direction is derived by the output data from the geomagnetic direction sensor 1. This is because, in the magnetization process mode, the center coordinate position is actually moved from the center coordinate position derived by the prior execution of the center position correction routine before the current magnetization level shift occurs and the traveling direction $\theta$ derived at the step 220 in the magnetization mode process is calculated using the center coordinate position derived before the current magnetization level shift occurs. Accordingly, the variation in the traveling direction can not be measured precisely based on the output data from the geomagnetic direction sensor 1.

It is also to be noted that although the traveling direction obtained by the output data of the gyro sensor includes a substantial error on a long-term basis due to a drift, it is considered to be accurate on a short-term basis in comparison with that derived by the output data from the geomagnetic direction sensor in the magnetization mode process.

Subsequently, at a step 804, a preliminary center position is calculated based on the data stored in the annular buffer B using a so-called method of isosceles triangle which will be described hereinbelow with reference to FIG. 19.

At a first step 900, the current traveling direction $\theta_G$ read out at the step 800 in FIG. 18(a) is stored as $\theta_{G1}$. Subsequently, at a step 910, a traveling direction $\theta_G$ which has a maximum angular difference from the current traveling direction $\theta_{G1}$ among the traveling directions $\theta_G$ stored in the annular buffer B, is read out as $\theta_{G2}$. At a next step 920, a directional difference $\Delta\theta_G$ between the traveling directions $\theta_{G1}$ and $\theta_{G2}$ is derived.

The preliminary center position can be derived in the following way.

Figure 23:
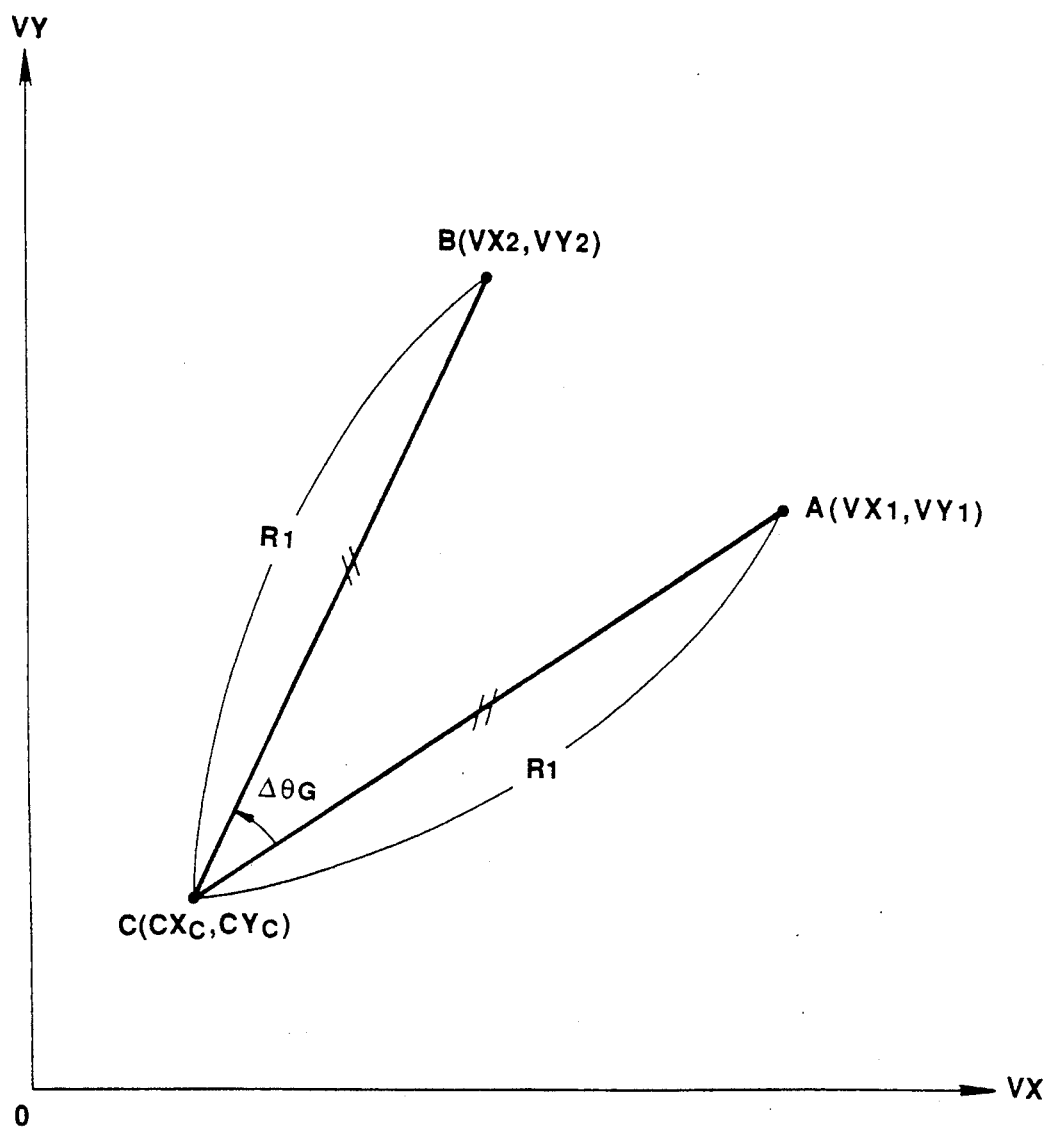
FIG. 23 is a graph showing a $V_x$-$V_y$ coordinate plane for explaining concepts for deriving a new preliminary center position using the method of isosceles triangle.

As shown in FIG. 23, a coordinate position A defined by the stored values $V_{x1}$ and $V_{y1}$ corresponding to $\theta_{G1}$ and a coordinate position B defined by the stored values $V_{x2}$ and $V_{y2}$ corresponding to $\theta_{G2}$ are set on a VX-VY coordinate plane. Then, the preliminary center position C ($C_{xc}$, $C_{yc}$) is derived such that the preliminary center position C is distanced by R1 from the respective coordinate positions A and B and an angle between two lines connecting the preliminary center position C and the respective coordinate positions A and B is $\Delta\theta_G$ ($\angle ACB = \Delta\theta_G$).

This is equivalent to deriving a preliminary center position by the following equation which is executed at a subsequent step 930.

$$\begin{bmatrix} C_{xc} \\ C_{yc} \end{bmatrix} = \frac{1}{(\cos\Delta\theta_G - 1)^2 + \sin^2\Delta\theta_G} \times \begin{bmatrix} \cos\Delta\theta_G - 1 & \sin\Delta\theta_G \\ -\sin\Delta\theta_G & \cos\Delta\theta_G - 1 \end{bmatrix} \times \tag{20}$$

-continued $$\left[ \begin{bmatrix} \cos\Delta\theta_G & -\sin\Delta\theta_G \\ \sin\Delta\theta_G & \cos\Delta\theta_G \end{bmatrix} \begin{bmatrix} V_{x1} \\ V_{y1} \end{bmatrix} - \begin{bmatrix} V_{x2} \\ V_{y2} \end{bmatrix} \right]$$

Subsequent to the step 930 where the preliminary center position is calculated as mentioned above, its calculation accuracy AC is derived at a step 940 using a function $f(\Delta\theta_G)$ with respect to the directional variation $\Delta\theta_G$. As seen from a graph of directional variation $\Delta\theta_G$ versus calculation accuracy AC shown at the step 940, a value of the function $f(\Delta\theta_G)$ gets larger as the directional variation $\theta_G$ gets larger, and is given in a range of 0 to 1.

The details of the so-called method of isosceles triangle described above is disclosed in Japanese First Utility Model Publication No. 1-117712 published on August 9, 1989, which is incorporated by reference for the sake of disclosure.

Referring back to FIG. 18(a), subsequent to a step where the calculation accuracy AC is derived as mentioned above, the routine goes to a step 808 where the current traveling direction $\theta_G$ is stored as $\theta_{OLD2}$ for a subsequent execution of the magnetization mode process if an answer at a step 812 is negative, which will be described later.

Subsequently, at a step 810, the derived calculation accuracy AC is compared with a predetermined threshold level $TH_1$. If an answer at the step 810 is NO, i.e. the calculation accuracy AC is no less than the threshold level $TH_1$, the routine goes to a step 818 bypassing subsequent steps 812 to 816. On the other hand, if the answer at the step 810 is YES, i.e. the calculation accuracy is less than the threshold level $TH_1$, the routine goes to the step 812. This is because, since the calculation accuracy is less in the foregoing method of isosceles triangle than in the foregoing method of least squares, the routine skips the steps 812 to 816 only when the derived calculation accuracy AC is no less than the threshold level $TH_1$.

At the step 812, a directional difference between a new traveling direction $\theta_G$ and the stored direction $\theta_{OLD3}$ is compared with a predetermined threshold level $THD_3$ which set, for example, to 90° in this embodiment. As appreciated, the threshold level $THD_3$ is considerably larger than the threshold level $THD_2$ which is set at 10°. If an answer at the step 812 is NO, i.e. the directional variation is less than the threshold level $THD_3$, then the routine returns to the step 800 to repeat the foregoing process. On the other hand, if the answer at the step 812 is YES, i.e. the directional difference is no less than the threshold level $THD_3$, then the routine goes to the steps 814 and 816 where the preliminary center position PC and its calculation accuracy AC are derived based on the data stored in the matrix buffer B using the foregoing method of least squares as in the same manner as described with reference to FIG. 15.

As appreciated, in the magnetization mode process, the preliminary center position is derived by the method of isosceles triangle per every small directional variation until the calculation accuracy AC gets no less than the threshold level $TH_1$. If the calculation accuracy AC gets no less than the threshold level $TH_1$, it is considered that the reliable preliminary center position PC is derived and the routine directly goes to the step 818. On the other hand, if it is continued that the calculation accuracy is less than the threshold level $TH_1$ and if an accumulated directional variation commencing from the initialization at the step 730 in FIG. 17 becomes no less than the threshold level $THD_3$, the preliminary center position PC and its calculation accuracy AC are derived based on the data stored in the matrix buffer B using the method of least squares.

Figure 18B:
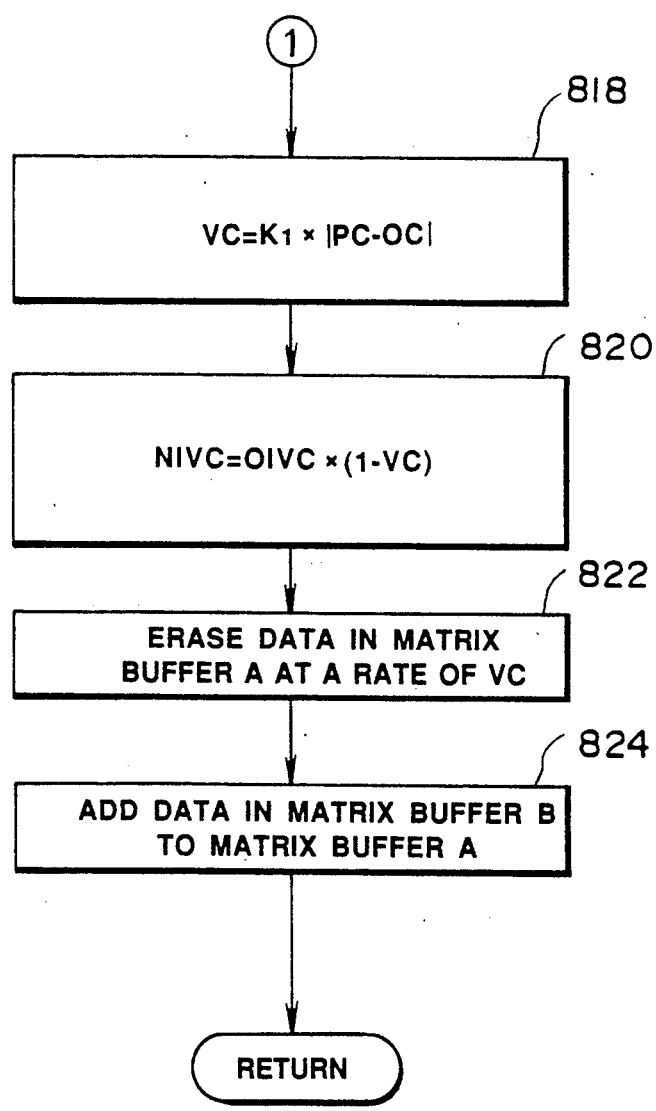

Referring now to the step 818 in FIG. 18(b), a coefficient VC indicative of a variation in the magnetization level shift on the vehicle body is derived by the following equation (21).

$$VC = K_1 \times |PC - OC| \qquad (21)$$

wherein, $K_1$ a set constant, PC denotes the preliminary center position, and OC is the latest center position derived through a prior execution of the center position correction routine as shown in FIG. 16. The coefficient VC is given in a range of 0 to 1 and is in proportion to a difference between the preliminary center position PC and the latest center position OC. Accordingly, the coefficient VC gets larger as the variation in the magnetization level gets larger.

Subsequently, at a step 820, the coefficient IVC, as mentioned before with reference to FIG. 16, is renewed. Specifically, a new coefficient NIvC is derived by the following equation (22).

$$NIVC = OIVC \times (1 - VC) \qquad (22)$$

wherein, OIVC is a latest coefficient IVC derived at the step 640 in a prior execution of the center position correction routine of FIG. 16, or a latest coefficient IVC used at the step 600 in the prior execution of the center position correction routine in which the step 640 was not executed in the prior execution thereof. The coefficient IVC is given no less than a value 1.

As appreciated from the equation (22), the new coefficient NIVC is set in a less value as the variation in the magnetization level gets larger, i.e. as the coefficient VC gets larger.

Subsequently, at a step 822, the data stored in the matrix buffer A are erased according to a rate determined by the coefficient VC. For example, each counter of the matrix buffer A is multiplied by $(1 - VC)$. Accordingly, if the coefficient VC is at its maximum value 1, then all the data stored in the matrix buffer A are erased at the step 822.

Subsequently, at a step 824, all the data stored in the matrix buffer B is added to the matrix buffer A.

The execution of the steps 822 and 824 is necessary for a subsequent execution of the normal mode process under the magnetization level substantially the same as the magnetization level under which the current magnetization mode process as mentioned above has been executed.

Figure 20A:
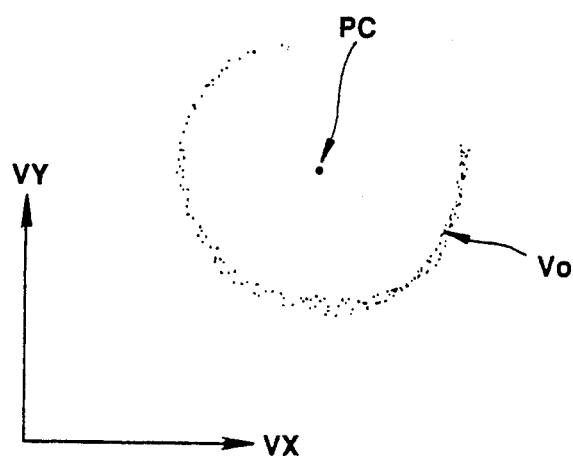
FIG. 20(a) is a graph showing a $V_x$-$V_y$ coordinate plane for explaining how to derive a new preliminary center position of a corresponding output circle in the normal mode process.
Figure 20B:
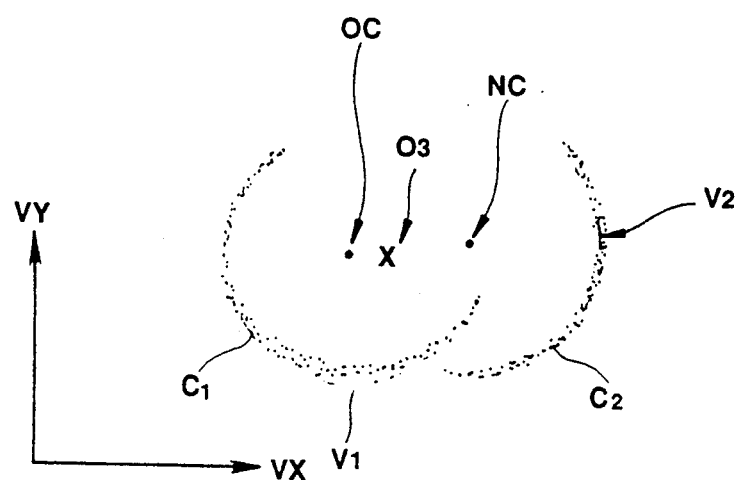
FIG. 20(b) is a graph showing a $V_x$-$V_y$ coordinate plane for explaining how to derive a new preliminary center position of a corresponding output circle in the magnetization mode process.

Accordingly, as shown in FIG. 20(a), in the normal mode process, a preliminary center position PC is derived based on all the data vo stored in the matrix buffer A. On the other hand, as shown in FIG. 20(b), in the magnetization mode process, an output circle $C_1$ which is derived by the data $V_1$ collected before a shift of the magnetization level moves to an output circle $C_2$ which is derived by the data $V_2$ collected after the shift of the magnetization level. Accordingly, the preliminary center position in the magnetization mode process should be derived based on only those data collected after the shift of the magnetization level. In FIG. 20(b), $O_3$ denotes a virtual center position derived based on mixture of the data $V_1$ and $V_2$.

Now, the center position correction routine of FIG. 16 after the execution of the magnetization mode process will be described hereinbelow. It is to be appreciated that the center position correction routine itself is the same as that after the execution of the normal mode process.

At the 600, the interior division rate DR is derived by the following equation (17).

$$DR = AC/IVC \qquad (17)$$

wherein, AC denotes the calculation accuracy derived at the step 806 or 816 in FIG. 18(a), and IVC denotes the new coefficient NIVC derived at the step 820 in FIG. 18(a).

As described above, the interior division rate DR is a coefficient for determining to what point between the preliminary center position derived at the steps 804 or 814 and a latest center position derived by a previous execution of the center position correction routine, a new center position should be approached. In other words, the interior division rate DR determines a point of the new center position between the preliminary center position and the latest center position.

The calculation accuracy is given, as mentioned above, within the range of 0 to 1, and the coefficient IVC is given no less than a value 1. At the step 820, it is set that the minimum value of the new coefficient NIVC is 1. Accordingly, the interior division rate DR is given in a range 0 to 1.

Subsequently, at the step 610, the new center position NC is derived by the following equation (18).

$$NC = OC + DR \times |PC - OC| \qquad (18)$$

wherein, OC denotes the latest center position derived by a previous execution of the center position correction routine, DR denotes the interior division rate, and PC denotes the preliminary center position derived at the step 804 or 814 in FIG. 18 (a);

As understood from the equation (18), the new center position approaches closer to the preliminary center position from the latest center position with a larger value of the interior division rate, as clearly shown in FIG. 22. Since the coefficient IVC is set small at the step 820 in FIG. 18(b), the interior division rate DR is set large at the step 600 so that the displacement of the center position gets larger toward the preliminary center position PC in the center position correction routine after the execution of the magnetization mode process.

Subsequently, the coefficient IvC is increased when conditions of the steps 620 and 630 are satisfied. Specifically, if the calculation accuracy AC derived at the step 806 or 816 in FIG. 18 (a) is decided to be larger than the predetermined threshold level $TH_2$ at the step 620, and the absolute difference between the preliminary center position PC and the new center position NC is decided to be less than a predetermined threshold level $THL_1$, a new coefficient NIVC is derived by the following equation (19).

$$NIVC = OIVC + K_2 \qquad (19)$$

wherein, $K_2$ is a set constant and OIVC den latest coefficient IVC derived at the step 820 as the new coefficient NIVC in FIG. 18(b) and used at the foregoing step 600 in the current execution of this correction routine.

Generally, since the calculation accuracy is not so high in the magnetization mode process in comparison with that derived in the normal mode process when the vehicle is traveling across the good geomagnetic environment and since the threshold level $TH_2$ is set quite high, the step 640 is unlikely to be executed through the execution of the magnetization mode process.

It is to be appreciated that, according to the foregoing preferred embodiment of the present invention, when reliable preliminary center positions are continuously obtained through sequential executions of the normal mode process, the coefficient IvC gets considerably large through sequential executions of the center position correction routine. Therefore, even if the vehicle travels across the bad geomagnetic environment, i.e. under the geomagnetic disturbance not large enough to magnetize the vehicle, after having travelled long in the good geomagnetic environment, so that the preliminary center position calculated deviates from the latest center position derived through a prior execution of the center position correction routine, the new center position does not move substantially because the coefficient IVC at the step 600 is considerably large to make the interior division rate at the step 610 considerably small. Accordingly, a reliable and stable measurement of the vehicle traveling direction is attained. On the other hand, immediately after the magnetization level on the vehicle body has shifted to a new magnetization level, i.e. in the magnetization mode process, the center position should be approached to a new center position, i.e. toward the preliminary center position without delay. This is accomplished by reducing the coefficient IVC drastically at the step 820 in FIG. 18(b) so as to derive a large interior division rate DR at the step 600 in FIG. 16.

Further, as appreciated from the foregoing description of the preferred embodiment, in the center position correction system through the normal mode process, not so substantial variation in the magnetization level, i.e. the variation less than the predetermined level, which is otherwise accumulated to the substantial variation no less than the predetermined level, can be gradually compensated each time the new center position is derived, while, in the center position correction system through the magnetization mode process, the substantial variation in the magnetization level no less than the predetermined level is drastically compensated.

It is to be understood that this invention is not to be limited to the embodiments described above, and that various changes and modifications may be made without departing from the spirit and scope of the invention as defined in the appended claims.

What is claimed is:

1. A system comprising:
   a geomagnetic sensor for sequentially deriving two directional component data of the geomagnetism around a vehicle, the two directions corresponding to said two directional component data, being orthogonal to each other on a horizontal plane;
   first means for deriving a traveling direction of the vehicle based on a direction toward a coordinate position defined by said two directional component data from a first coordinate position of a center of a corresponding output circle;
   second means for deciding whether a magnetization level on a vehicle body is shifted from a first level to a second level based on said two directional component data;
   third means for storing a first group of said two directional component data;
   fourth means for storing a second group of said two directional component data;
   fifth means for deriving a second coordinate position as a preliminarily corrected value of said first coordinate position based on said first group of the data, said second coordinate position derived for said first magnetization level in response to a negative decision of said second means;
   sixth means for deriving a third coordinate position as a preliminarily corrected value of said first coordinate position based on said second group of the data, said third coordinate position derived for said second magnetization level in response to a positive decision of said second means;
   seventh means for deriving a first value indicative of accuracy of said second or third coordinate position;
   eighth means for deriving a second value which is variable depending on a variation in the magnetization level on the vehicle body;
   ninth means for calculating a fourth coordinate position as a finally corrected value of said first coordinate position based on said second or third coordinate position and
   a latest value of said fourth coordinate position, said latest value derived in a prior calculation executed by said ninth means, by using a rate derived from said first and second values, said rate determining an amount of displacement of said 5 fourth coordinate position between said latest value and said second or third coordinate position so as to determine a point of said fourth coordinate position.

2. The system as set forth in claim 1, wherein said first level or second level of the magnetization includes a zero level.

3. The system as set forth in claim 1, wherein said second means yields said positive decision when the magnetization level is first shifted from the first level to the second level and then the second level is maintained.

4. The system as set forth in claim 1, wherein said fourth coordinate position is derived closer to said second or third coordinate position as said first value is larger provided that said second value is constant.

5. The system as set forth in claim 1, wherein said fourth coordinate position is derived closer to said second or third coordinate position as said second value is less provided that said first value is constant.

6. The system as set forth in claim 1, wherein said second value is constant during said variation in the magnetization level being zero.

7. The system as set forth in claim 1, wherein said eighth means includes tenth means for deriving a third value indicative of the variation in the magnetization level from the first level to the second level, said tenth means being operable only when said third coordinate position is derived by said sixth means, and said eighth means derives said second value based on said third value.

8. The system as set forth in claim 7, wherein said third value is derived by a following equation:

$$VC = K \times |PC - OC|$$

wherein, vC denotes said third value and is given in a range of 0 to 1, K denotes a constant, PC denotes said second or third coordinate position, and OC denotes said latest value of said fourth coordinate position.

9. The system as set forth in claim 8, wherein said second value is derived by a following equation:

$$IVC = OIVC \times (1 - VC)$$

wherein, IVC denotes said second value and is given no less than a value 1, OIVC denotes a latest value of said second value derived in a prior calculation executed by said eighth means and is given no less than a value 1, and VC denotes said third value and is given in a range of 0 to 1.

10. The system as set forth in claim 1, wherein said ninth means includes eleventh means for deriving a fourth value by a following equation:

$$DR = AC/IVC$$

wherein, DR denotes said fourth value and is given in a range of 0 to 1, AC denotes said first value and is given in a range of 0 to 1, and IVC denotes said second value and is given no less than 1, and said fourth coordinate position is derived by a following equation:

$$NC = OC + PR \times |PC - OC|$$

wherein, NC den said fourth coordinate position, OC said latest value of said fourth coordinate position, DR denotes said fourth value, and PC denotes said second or third coordinate position.

11. The system as set forth in claim 3, wherein said second group of the data is those data derived after a decision of said second means that the magnetization level is first shifted from the first level to the second level.

12. The system as set forth in claim 11, wherein said eighth means includes tenth means for deriving a third value indicative of the variation in the magnetization level from the first level to the second level, said tenth means being operable only when said third coordinate position is derived by said sixth means, and said eighth means derives said second value based on said third value.

13. The system as set forth in claim 12, wherein twelfth means is included for erasing said first group of the data according to a second rate determined by said third value and for adding said second group of the data to said first group of the data.

14. The system as set forth in claim 13, wherein said third means stores all the two directional component data derived during traveling of the vehicle except for those data erased by said twelfth means.

15. The system as set forth in claim 1, wherein said second value is increased by a predetermined constant after said ninth means calculates said fourth coordinate position when said first value is more than a predetermined level and an absolute difference between said second or third coordinate position and said fourth coordinate position is less than a predetermined level.

16. A system comprising:
a geomagnetic sensor for sequentially deriving two directional component data of the geomagnetism around a vehicle, the two directions corresponding to said two directional component data, being orthogonal to each other on a horizontal plane;
first means for deriving a first traveling direction of the vehicle based on a direction toward a coordinate position defined by said two directional component data from a first coordinate position of a center of a corresponding output circle;
second means for deriving a variation in a traveling direction of the vehicle base on data output from a non-geomagnetic second sensor, said second sensor outputting said data without being affected by the geomagnetism around the vehicle;
third means for deriving a second traveling direction of the vehicle based on said variation derived by said second means;
fourth means for deciding whether a magnetization level on a vehicle body is shift from a first level to a second level based on said two direction component data;
fifth means for storing a first group of said two directional component data;
sixth means for storing a second group of said two directional component data;
seventh means for storing a third group of said two directional component data and corresponding data of said second traveling direction of the vehicle;
eighth means for deriving a second coordinate position as a preliminarily corrected value of said first coordinate position based on said first group of the data, said second coordinate position derived for said first magnetization level in response to a negative decision of said fourth means;
ninth means for deriving a third coordinate position as a preliminarily corrected value of said first coordinate position based on the data stored in said seventh means, said third coordinate position derived for said second magnetization level in response to a positive decision of said fourth means;
tenth means for deriving a first value indicative of accuracy of said second coordinate position;
eleventh means for deriving a second value indicative of accuracy of said third coordinate position;
twelfth means for deriving a fourth coordinate position as a preliminarily corrected value of said first coordinate position based on said second group of the data, said fourth coordinate position derived for said second magnetization level when said second value is less than a first predetermined level;
thirteenth means for deriving a third value indicative of accuracy of said fourth coordinate position;
fourteenth means for deriving a fourth value which is variable depending on a variation in the magnetization level on the vehicle body;
fifteenth means for calculating a fifth coordinate position as a finally corrected value of said first coordinate position based on said second or third or fourth coordinate position and a latest value of said fifth coordinate position, said latent value derived in a prior calculation executed by said fifteenth means, by using a rate derived from said first or second or third value and said fourth value, said rate determining an amount of displacement of said fifth coordinate position between said latest value and said second or third or fourth coordinate position so as to determine a point of said fifth coordinate position between said latest value and said second or third or fourth coordinate position.

17. The system as set forth in claim 16, wherein said fourth means yields said positive decision when the magnetization level is first shifted from the first level to the second level and then the second level is maintained.

18. The system as set forth in claim 17, wherein said fourteenth means includes sixteenth means for deriving a fifth value indicative of the variation in the magnetization level from the first level to the second level, said sixteenth means being operable only when said third or fourth coordinate position is derived by said ninth or twelfth means, and said fourteenth means derives said fourth value based on said fifth value.

19. The system as set forth in claim 18, wherein said data stored in said sixth and seventh means are those data derived after a decision of said fourth means that the magnetization level is first shifted from the first level to the second level, and said first group of the data is erased according to a rate determined by said fifth value and is added with said second group of the data.

20. The system as set forth in claim 17, wherein said twelfth means derives said fourth coordinate position when said second value is less than said first predetermined level and when a first directional variation after a decision of said fourth means that the magnetization level is first shifted from the first level to the second level, is larger than a second predetermined level, said first directional variation derived by said second means.

21. The system as set forth in claim 20, wherein said ninth means derives said third coordinate value when a second directional variation after said decision of the fourth means is larger than a third predetermined level, said second directional variation derived by said second means and said third predetermined level being less than said second predetermined level.

22. The system as set forth in claim 21, wherein said ninth means repeats said derivation of the third coordinate position until said second value becomes no less than said first predetermined level but before said first directional variation becomes larger than said second predetermined level.

* * * * *